United States Patent
Park et al.

(10) Patent No.: US 11,739,959 B2
(45) Date of Patent: Aug. 29, 2023

(54) AIR PURIFICATION DEVICE AND METHOD FOR CONTROLLING SAME

(71) Applicant: Samsung Electronics Co., Ltd., Suwon-si (KR)

(72) Inventors: Jang-pyo Park, Hwaseong-si (KR); Yong-won Jeong, Seoul (KR); Jae-hong Kim, Incheon (KR); Sang-hun Lee, Yongin-si (KR); Jeong-eun Lee, Seongnam-si (KR); Hye-jung Cho, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 16/628,378

(22) PCT Filed: Jul. 19, 2018

(86) PCT No.: PCT/KR2018/008153
§ 371 (c)(1),
(2) Date: Jan. 3, 2020

(87) PCT Pub. No.: WO2019/050154
PCT Pub. Date: Mar. 14, 2019

(65) Prior Publication Data
US 2020/0182495 A1    Jun. 11, 2020

Related U.S. Application Data

(60) Provisional application No. 62/554,308, filed on Sep. 5, 2017.

(30) Foreign Application Priority Data

Mar. 5, 2018    (KR) .......................... 10-2018-0025738

(51) Int. Cl.
    F24F 8/80    (2021.01)
    F24F 13/28   (2006.01)
    (Continued)

(52) U.S. Cl.
    CPC .................. F24F 8/80 (2021.01); F24F 8/10 (2021.01); F24F 13/28 (2013.01); F24F 8/22 (2021.01);
    (Continued)

(58) Field of Classification Search
    CPC ...... F24F 8/10; F24F 13/28; F24F 8/22; F24F 11/56; F24F 13/20; F24F 2006/008;
    (Continued)

(56) References Cited

U.S. PATENT DOCUMENTS 3,071,914 A * 1/1963 Gesmar .................... F24F 8/10
                                                   116/DIG. 25
6,834,847 B2 * 12/2004 Bartsch .................. A61L 9/127
                                                   261/DIG. 89
(Continued)

FOREIGN PATENT DOCUMENTS

JP    2000-262826 A      9/2000
JP    2000262826    *    9/2000
(Continued)

OTHER PUBLICATIONS

Epo translation of KR 100809093 (Year: 2008).*
(Continued)

*Primary Examiner* — Stephen Hobson
(74) *Attorney, Agent, or Firm* — Jefferson IP Law, LLP

(57) ABSTRACT

An air purifier is provided. The air purifier includes a plurality of filters, a driving unit configured to individually move the plurality of filters, and a processor configured to
(Continued)

control the driving unit so that at least one of the plurality of filters is disposed in an air passage in the air purifier according to an air state.

10 Claims, 24 Drawing Sheets

(51) Int. Cl.
*F24F 8/10* (2021.01)
*F24F 110/50* (2018.01)
*F24F 11/56* (2018.01)
*F24F 13/20* (2006.01)
*F24F 6/00* (2006.01)
*F24F 8/22* (2021.01)

(52) U.S. Cl.
CPC .............. *F24F 11/56* (2018.01); *F24F 13/20* (2013.01); *F24F 2006/008* (2013.01); *F24F 2013/205* (2013.01); *F24F 2110/50* (2018.01)

(58) Field of Classification Search
CPC .. F24F 2013/205; F24F 2110/50; F24F 1/035; F24F 11/39; F24F 11/65; F24F 11/70; F24F 13/24; F24F 11/62; F24F 2013/247; F24F 2110/64; F24F 2110/65; F24F 2120/20; Y02B 30/70
See application file for complete search history.

(56) References Cited

U.S. PATENT DOCUMENTS

| | | | |
|---|---|---|---|
| 6,860,916 B2 | 3/2005 | Kubokawa et al. | |
| 7,452,396 B2* | 11/2008 | Terlson | B01D 46/521 55/497 |
| 7,537,630 B2 | 5/2009 | Schuld et al. | |
| 8,496,514 B2 | 7/2013 | Kim et al. | |
| 8,757,154 B2* | 6/2014 | Schuller | A61M 16/0063 128/205.27 |
| 8,852,309 B2* | 10/2014 | Scott | B01D 46/2403 55/498 |
| 8,979,966 B2* | 3/2015 | Lise | B01D 46/0001 55/497 |
| 9,242,201 B2* | 1/2016 | Bao | B32B 5/26 |
| 9,327,225 B2* | 5/2016 | Kim | A61L 9/16 |
| 10,712,028 B2* | 7/2020 | Su | F24F 8/15 |
| 2010/0106312 A1* | 4/2010 | Grohman | F24F 11/77 700/276 |
| 2010/0285731 A1 | 11/2010 | Kim | |
| 2013/0319251 A1* | 12/2013 | Cheung | G10K 11/1785 96/380 |
| 2015/0306533 A1* | 10/2015 | Matlin | F24F 8/158 96/417 |
| 2018/0111078 A1* | 4/2018 | Taylor | B01D 46/0045 |
| 2018/0345194 A1* | 12/2018 | Gregerson | F24F 13/28 |

FOREIGN PATENT DOCUMENTS

| | | | |
|---|---|---|---|
| JP | 4493550 B2 | | 6/2010 |
| JP | 2012-254239 A | | 12/2012 |
| JP | 2012254239 | * | 12/2012 |
| JP | 2016-159191 A | | 9/2016 |
| KR | 1998-0023782 A | | 7/1998 |
| KR | 20-0347521 Y1 | | 4/2004 |
| KR | 10-0809093 B1 | | 3/2008 |
| KR | 100809093 | * | 3/2008 |
| KR | 10-2009-0050504 A | | 5/2009 |
| KR | 10-2012-0094304 A | | 8/2012 |
| KR | 10-2013-0090688 A | | 8/2013 |
| KR | 10-1386187 B1 | | 4/2014 |
| KR | 10-2017-0031949 A | | 3/2017 |
| KR | 20170031949 | * | 3/2017 |
| WO | 2016/097385 A1 | | 6/2016 |
| WO | 2017/109206 A1 | | 6/2017 |

OTHER PUBLICATIONS

Epo translation of JP 2012254239 (Year: 2012).*
Epo translation of KR 20170031949 (Year: 2017).*
Epo translation of JP2000262826 (Year: 2000).*
"How to install a Curved Sliding Doors by Balcony Systems Solutions—www.Balconette.co.uk (W6-F)" balconette accessed at <https://www.youtube.com/watch?v=LilSgzMN5Rc> and published Oct. 21, 2011 (Year: 2011).*
Extended European Search Report dated May 15, 2020, issued in European Application No. 18854420.9.
European Examination Report dated Jul. 5, 2022; European Appln. No. 18 854 420.9-1016.
Korean Office Action with English translation dated Aug. 22, 2022; Korean Appln. No. 10-2018-0025738.
Korean Office Action with English translation dated Feb. 22, 2023; Korean Appln. No. 10-2018-0025738.

* cited by examiner

FIG. 17
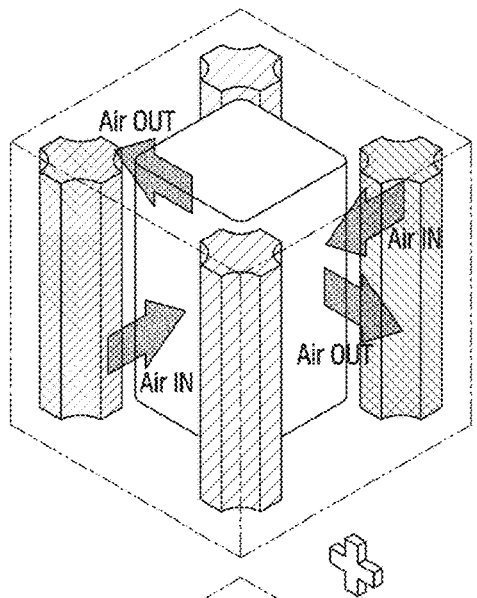
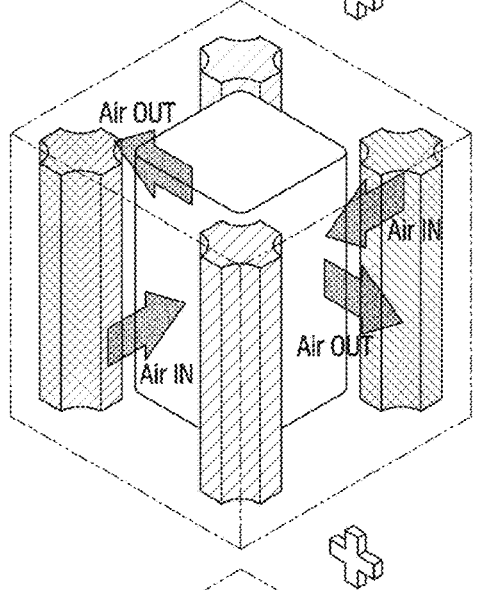
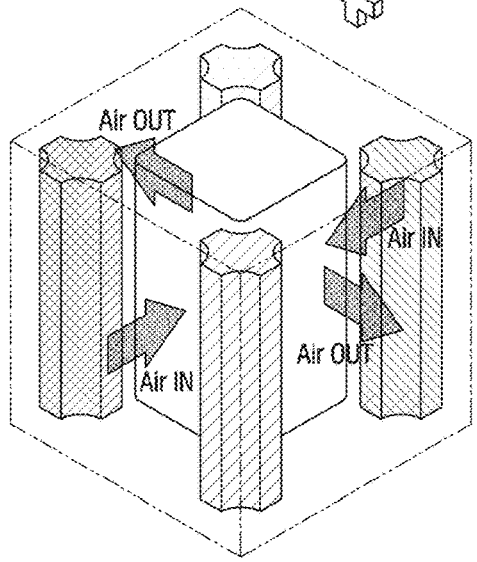

AIR PURIFICATION DEVICE AND METHOD FOR CONTROLLING SAME

TECHNICAL FIELD

The disclosure relates to an air purifier and a controlling method thereof and, more specifically, to an air purifier capable of selectively using a filter and a controlling method thereof.

BACKGROUND ART

Amid increasing demand for an air purifier for purifying indoor air due to recent air pollution, fine dust, yellow sand, or the like, various types of air purifiers have been produced.

An air purifier is equipped with various filters for purifying various sizes of dust, odor particles, harmful gases, etc. included in incoming air. For example, various types of filters, such as a filter for removing dust, a filter for removing odors, or the like, are installed in the air purifier.

In the related-art air purifier, the noise is generated while the air passes through the filter, and thus, when the air purifier is in the maximum purification mode, the noise is significant. In addition, since the flow rate of air is reduced while passing through the filter, the more the filter through which air should pass, the less clean air delivery rate (CADR) would be reduced.

However, the related-art air purifier has a structure in which the air must pass through all the various filters installed in the air purifier. That is, even if there is a filter that is not needed in the current air state, air has to pass through the filter.

Accordingly, as a filter that is not necessary is used, there is a need to develop an air purifier capable of solving a noise problem and air purification capability degradation problem.

DISCLOSURE

Technical Problem

The disclosure provides an air purifier for selective use of a filter and a controlling method thereof.

Technical Solution

An air purifier according to an embodiment includes a plurality of filters, a driving unit configured to individually move the plurality of filters, and a processor configured to control the driving unit so that at least one of the plurality of filters is disposed in an air passage in the air purifier according to an air state.

The air purifier further includes a sensor configured to obtain a sensing value to identify the air state, and the sensor includes at least one of a gas sensor, a dust sensor, and an environment sensor.

The processor may identify a type of a gas based on the sensing value of the sensor, and control the driving unit to dispose a filter, among the plurality of filters, that corresponds to the identified type of a gas on the air passage.

The plurality of filters may include a harmful gas filter and a deodorizing filter, and the processor may, based on the identified type of gas being a harmful gas, control the driving unit to dispose the harmful gas filter in the air passage and dispose the deodorizing filter outside the air passage and, based on the identified type of gas being a gas that generates odor and is not harmful, control the driving unit to dispose the deodorizing filter in the air passage, and dispose the harmful gas filter outside the air passage.

The plurality of filters may include a plurality of dust filters, and the processor may control the driving unit to dispose a dust filter, among the plurality of filters, in a number corresponding to a dust amount that is identified based on a sensing value of the dust sensor in the air passage.

The air purifier may further include an inputter configured to receive a user input for selecting any one of a plurality of air purification modes, and the processor may control the driving unit according to an air purification mode that is selected through the inputter.

The plurality of filters are movable along a circular path within the air purifier, and the driving unit may dispose at least one filter among the plurality of filters at a position that is perpendicular to a direction in which air passes in the circular path by a control of the processor.

There is provided a plurality of circular paths through which the plurality of filters individually move, and the plurality of circular paths may include a first circular path and a second circular path that surrounds the first circular path.

The plurality of filters are filters capable of being folded and unfolded, and the driving unit may unfold the at least one filter among the plurality of filters and fold remaining filters by control of the processor.

The plurality of filters are capable of moving in an upward direction and a downward direction, and the driving unit may move remaining filters except the at least one filter, among the plurality of filters, in an upward direction by control of the processor.

The air purifier may further include a memory configured to store information on history about each of the plurality of filters being disposed in the air passage, and the processor may provide a user with a filter replacement notification based on the information.

The air purifier according to an embodiment may further include a cyclone configured to suck air.

The air purifier according to an embodiment may further include a circulator that discharges air in an upward direction for circulation of purified air.

A control method of an air purifier including a driving unit for individually moving a plurality of filters includes identifying an air state and controlling the driving unit to dispose at least one filter among the plurality of filters in an air passage in the air purifier according to the identified air state.

The identifying may include determining an air state based on a sensing value obtained through a sensor of the air purifier, and the sensor may include at least one of a gas sensor, a dust sensor, and an environment sensor (for example, a presence sensor, a motion sensor, a noise sensor, a ultraviolet sensor, a temperature sensor, a humidity sensor, or the like).

The identifying may identify a type of a gas based on a sensing value of the gas sensor, and the controlling may control the driving unit to dispose a filter corresponding to the identified type of the gas, among the plurality of filters, in the air passage.

The plurality of filters may include a harmful gas filter and a deodorizing filter, and the controlling may include controlling the driving unit to dispose, when the identified type of gas is a harmful gas, dispose the harmful gas filter in the air passage, and dispose the deodorizing filter outside the air passage, and based on the identified type of gas being a gas that generates odor and is not harmful, control the driving unit to dispose the deodorizing filter in the air passage, and dispose the harmful gas filter outside the air passage.

The plurality of filters may include a plurality of dust filters, and the controlling may include controlling the driving unit to dispose a dust filter, among the plurality of filters, in a number corresponding to a dust amount that is identified based on a sensing value of the dust sensor in the air passage.

The control method according to an embodiment may further include receiving a user input for selecting any one of a plurality of air purification modes and controlling the driving unit according to a selected air purification mode according to the user input.

The control method according to an embodiment may further include storing information on a history that each of the plurality of filters is disposed in the air passage and providing a use with a filter replacement notification based on the information.

DESCRIPTION OF DRAWINGS

FIGS. 15 to 18 are views to describe an air purifier of a modular type according to various embodiments;

DETAILED DESCRIPTION OF EXEMPLARY EMBODIMENTS

Figure 1:
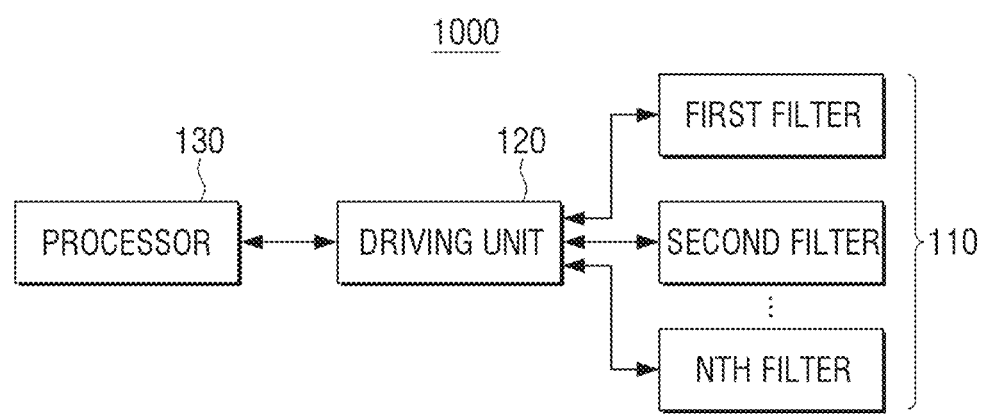
FIG. 1 is a block diagram to describe a configuration of an air purifier according to an embodiment.

When it is decided that a detailed description for the known art related to the disclosure may obscure the gist of the disclosure, the detailed description will be omitted. The terms described below are terms defined in consideration of the functions of the disclosure, and may vary depending on intention or relation of a user or an operator. Definition of the term may be construed based on the overall contents of the disclosure.

The terms such as "first," "second," and so on may be used to describe a variety of elements, but the elements should not be limited by these terms. The terms are used only for the purpose of distinguishing one element from another.

The terms used in the disclosure are to describe a specific embodiment, and is not purposed to limit the scope of claims. A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Hereinafter, embodiments will be described in detail with reference to the accompanying drawings so that those skilled in the art may easily carry out the embodiment. However, the disclosure may be embodied in many different forms and is not limited to the embodiments described herein. In order to clearly illustrate the disclosure in the drawings, portions which are not related to the description have been omitted, and like reference numerals have been assigned to similar portions throughout the specification.

Hereinafter, the disclosure will be further described with reference to drawings.

FIG. 1 is a view to describe a configuration of an air purifier according to an embodiment.

Referring to FIG. 1, the air purifier 1000 includes a plurality of filters 110, a driving unit 120, and a processor 130. Some of the configurations may be omitted according to a type of practice, and even if some configurations are not illustrated, appropriate configurations in a level of obvious to those skilled in the art may be additionally included in the air purifier 1000.

The air purifier 1000 is a device including a ventilator for purifying of ventilation air and recycled air for air conditioning inside a building, and is installed in a general house, an office, or the like, to collect dust floating in the air or to remove gas. An air purifier may refer to any device having a function of purifying air. For example, the air purifier can be implemented as a device having a purpose of air purification only, or a device capable of performing a complex function, such as an air conditioner having an air purification function, a humidifier equipped with an air cleaning function, or the like.

The plurality of filters 110 have the configuration for filtering or removing contaminants, germs, virus, dust, or the like, in the air, and include various types of filters. A type of a filter may be divided into a dust filter, a harmful gas filter, a deodorizing filter, a sterilization filter, or the like, depending on which is to be removed.

The plurality of filters 110 may include filters specialized for certain harmful substances. For example, the plurality of filters 110 may include various filters such as a formaldehyde removal filter, an oil mist removal filter, a sterilization/allergen removal filter, a deodorizing filter (ammonia, hydrogen sulfide, etc.), a dust filter, or the like.

The filter may be divided into a dust-collection type, an adhesion type, a catalyst type, or the like, and the plurality of filters 110 may include various types of filters.

The above is merely exemplary, and more various types of filters may be included in the plurality of filters 110 according to a use purpose of the air purifier 1000.

The plurality of filters 110 may be individually detached and attached and may configure filters in a combination of a type desired by a user. The plurality of filters 110 may be manufactured as a module, a cartridge type, and may have a same size.

According to the disclosure, the plurality of filters 110 are individually movable in the air purifier 1000. By implementing the plurality of filters 110 to be individually movable, only necessary filters among the plurality of filters 110 may be used for air purification. That is, according to circumstances, only necessary filters may be arranged in an air passage of the air purifier 1000 and other filters may be arranged outside the air passage. The air passage means a passage through which air that requires purification passes in the air purifier 1000, and only the necessary filters may be disposed in the air passage and the fan may be rotated so as to prevent air from passing through the remaining filters. The direction of the air passage in the air purifier 1000 may always be constant, or the direction of the air passage may be changed by controlling the rotation of the fan in the air purifier 1000.

According to an embodiment, the plurality of filters 110 can individually move in the direction of, for example, up and down, left and right, diagonal lines, etc. within the air purifier 1000. According to another embodiment, the plurality of filters 110 are movable along a circular path provided in the air purifier 1000. According to another embodiment, the plurality of filters 110 may be folded and unfolded in the air passage, and the filters may be in the air passage in the unfolded state and outside the air passage in the folded state.

The plurality of filters 110 may be configured to have the same movements, or have different movements. In the latter case, for example, some filters among the plurality of filters 110 may be movable upward or downward, and other filters may be folded or unfolded.

The driving unit 120 is configured to individually move the plurality of filters 110. According to an embodiment, the driving unit 120 can move each of the plurality of filters 110 in upward, downward, left or right directions. According to another embodiment, the driving unit 120 can move the plurality of filters 110 along a circular path in the air purifier 1000 individually. According to still another embodiment, the driving unit 120 can individually fold or unfold the plurality of filters 110 that can be folded and unfolded. According to still another embodiment, the driving unit 120 can individually fold or unfold the plurality of filters 110 that can be folded and unfolded.

If some filters among the plurality of filters 110 move in a first movement (for example, movement in left or right directions), and some other filters move in a second movement (for example, movement in an up and down directions), the driving unit 120 may drive filters to suit for movements of each filter.

The driving unit 120 includes an actuator that provides power to move the filter. An actuator is a device for generating power by receiving energy from the outside. The actuator may include an electric motor, an electromagnet, a cylinder or motor that operates with air pressure or hydraulic pressure, or the like.

The driving unit 120 can implement the movement of the various filters described above through various combinations of actuators, gears, chains, rollers, or the like. For example, the driving unit 120 may include a servo actuator, a motor such as a stepper motor, a gear and a connecting chain, or the like. According to an embodiment, the plurality of filters 110 can move, as a chain is connected to each of the plurality of filters 110, and a gear connected to the motor is in contact with the chain and rotated.

The processor 130 is configured to control the overall operation of the air purifier 1000. The processor 130 may be implemented as, for example, a central processing unit (CPU) (or a digital signal processor (DSP), a micro processing unit (MPU), or the like), an application specific integrated circuit (ASIC), a system on chip (SoC), a microcomputer (MICOM), or the like. The processor 130 may operate an operating system or an application program to control a plurality of hardware or software components connected to the processor 130, and may perform various data processing and operations.

The processor 130 may control the driving unit 120 to individually move the plurality of filters 110. According to an embodiment, the processor 130 may control the driving unit 120 so that at least one of the plurality of filters 110 is disposed in the air passage in the air purifier 1000.

The processor 130 may control the air passage to pass air in a situation where the at least one filter is disposed in the air passage and the remaining filter is disposed outside the air passage. For example, the processor 130 may control a fan (not shown) in the air purifier 1000 to rotate to allow air to pass through the air passage. For example, the processor 130 may control so that a fan (not shown) in the air purifier 1000 is rotated so as to pass air through the air passage.

The air purifier 1000 may include a sensor for acquiring a sensing value to identify an air state. The sensor may be, for example, a gas sensor and/or a dust sensor, or the like.

As the dust sensor, for example, a sensor which flows particles through forced convection using a heater inside the sensor and measures an amount detected through absorption, reflection, scattering, or the like, using a light source, and a sensor for measuring the weight of dust by accumulating dust particles may be used.

A gas sensor may be used as one or multiple. There are various types of gas sensors according to a gas sensing method. The method of gas sensing includes contact combustion method, electrochemical method (for example: solution conduction, electrostatic electrolysis, diaphragm electrode method), thermal conductivity method, optical methods (for example: infrared absorption, visible light absorption, optical interferometry), electrical methods (for example: hydrogen ionization, thermal conduction, catalytic combustion, semiconductor methods), reaction coloring methods, solution conductivity method, solid electrolyte method, gas chromatography, or the like.

Here, the semiconductor method uses a phenomenon in which the conductivity is increased when the reducing gas is adsorbed to the semiconductor (N-type center) of the metal oxide, and the contact combustion method is a method of measuring the concentration of the reaction gas by checking the increase in the electrical resistance of the platinum line when the temperature rises by burning the combustible gas with a catalyst such as platinum, the electrochemical method is a method for measuring the concentration of a gas by sensing a change in a current value generated by an oxidation reduction reaction of an anode and a cathode in an electrolyte (for example: Conc-$H_2SO_4$), and the thermal conductivity method is a method for measuring the concentration of the gas by measuring the concentration of the gas by measuring the resistance value of the platinum wire and the thermistor by using the thermal conductivity identified by the surrounding gas, the optical interference method is a method for measuring the concentration of gas using interference fringes by a difference of a refractive index between air/subject gas, and the reaction coloring method is a method for measuring concentration of gas by reacting the gas with a liquid or a solid for coloration and measuring the degree of coloring optically, the solution conductivity method is a method for measuring the concentration of the gas by absorbing the measurement gas into a suitable solution for measuring the concentration of the gas, and the solid electrolyte method is a method for measuring the gas by using the electromotive force by the partial pressure difference, when there is a difference in oxygen partial pressure through the solid electrolyte of oxygen icon conductivity.

According to an embodiment, a gas sensor may be provided for each gas to be measured. For example, the air purifier 1000 may include a plurality of gas sensors, such as a first gas sensor for sensing ammonia, a second gas sensor for sensing formaldehyde, a third gas sensor for sensing toluene, or the like. The processor 130 may identify the type of gas present in the air based on the sensing values of each of the plurality of gas sensors.

According to still another embodiment, the air purifier 1000 may include a plurality of gas sensors of different types, and may identify the type of gas based on the point that the percentages of the sensing values of the different types of the plurality of gas sensors are different from each other for each gas.

Here, that the plurality of gas sensors are different types can mean a different gas sensing method. For example, one of the plurality of gas sensors may be a gas sensor using a contact combustion method and the other may be a gas sensor using a thermal conductivity method.

Alternatively, that the plurality of gas sensors are different types may mean that the gas sensing method may be the same (for example, a plurality of gas sensors use the same semiconductor method), but there is a difference in the manufacturing process of the gas sensor. That there is a difference in the manufacturing process of the sensor may mean, for example, that the shape of the sensor is different, a manufacturer of the sensor is different, or a manufacturing date, version, or the like may be different even for the same manufacturer.

A plurality of gas sensors having different gas sensing method or a plurality of gas sensors for detecting gas by the same method but with a different manufacturing process may have different sensing values for each gas sensor in the same environment.

According to an embodiment, the air purifier 1000 stores information about a sensing value of a plurality of gas sensors in advance when reacting with various gases. For example, the information about the sensing value when the plurality of gas sensors react with formaldehyde, the information about the sensing value when the plurality of gas sensors react with the ammonia, information about the sensing value when the plurality of gas sensors react with the toluene, or the like, can be prestored in the air purifier 1000. When a sensing value is obtained through a plurality of gas sensors, the processor 130 can identify the type of gas as compared to the prestored information as shown above. For example, it is assumed that the air purifier 1000 includes a first gas sensor and a second gas sensor, and the information that the ratio of the sensing value of the first gas sensor to the sensing value of the second gas sensor is 1:2 is prestored. In this case, if the ratio of the sensing value of the first gas sensor and the sensing value of the second gas obtained when the first gas sensor and the second gas sensor react with the unknown gas is 1:2, the processor 130 can identify that the unknown gas is formaldehyde.

According to the embodiment above, a type of gases may be identified using a plurality of gas sensors. In addition, the concentration of gas may be identified based on the size of the sensing value.

According to another embodiment, instead of using a plurality of gas sensors as described above, one semiconductor gas sensor having different reaction characteristics with respect to gas can be used depending on the temperature. That is, one semiconductor gas sensor capable of operating at various temperatures can replace a plurality of different types of semiconductor gas sensors. According to an embodiment, the processor 130 can control the temperature of the heater present in the semiconductor gas sensor.

The processor 130 may control the driving unit 120 so that at least one filter among the plurality of filters 110 is disposed in the air passage inside the air purifier 1000, according to air state that is identified based on the output value of the dust sensor and/or gas sensor.

According to an embodiment, the processor 130 may identify the type of gas based on a sensing value of at least one gas sensor of the air purifier 1000, and may control the driving unit 120 so that a filter corresponding to the identified type of gas among the plurality of filters 110 is disposed in the air passage.

Figure 2:
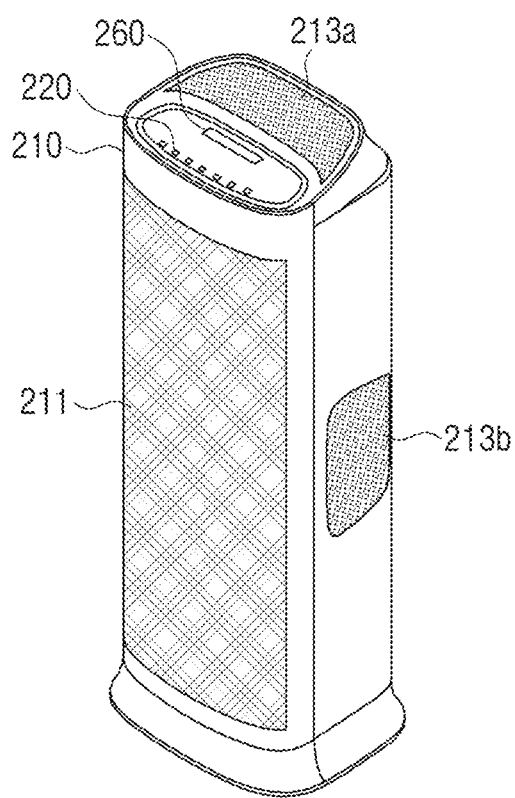
FIGS. 2 and 3 are views to describe an exterior and an interior of an air purifier according to an embodiment.
Figure 3:
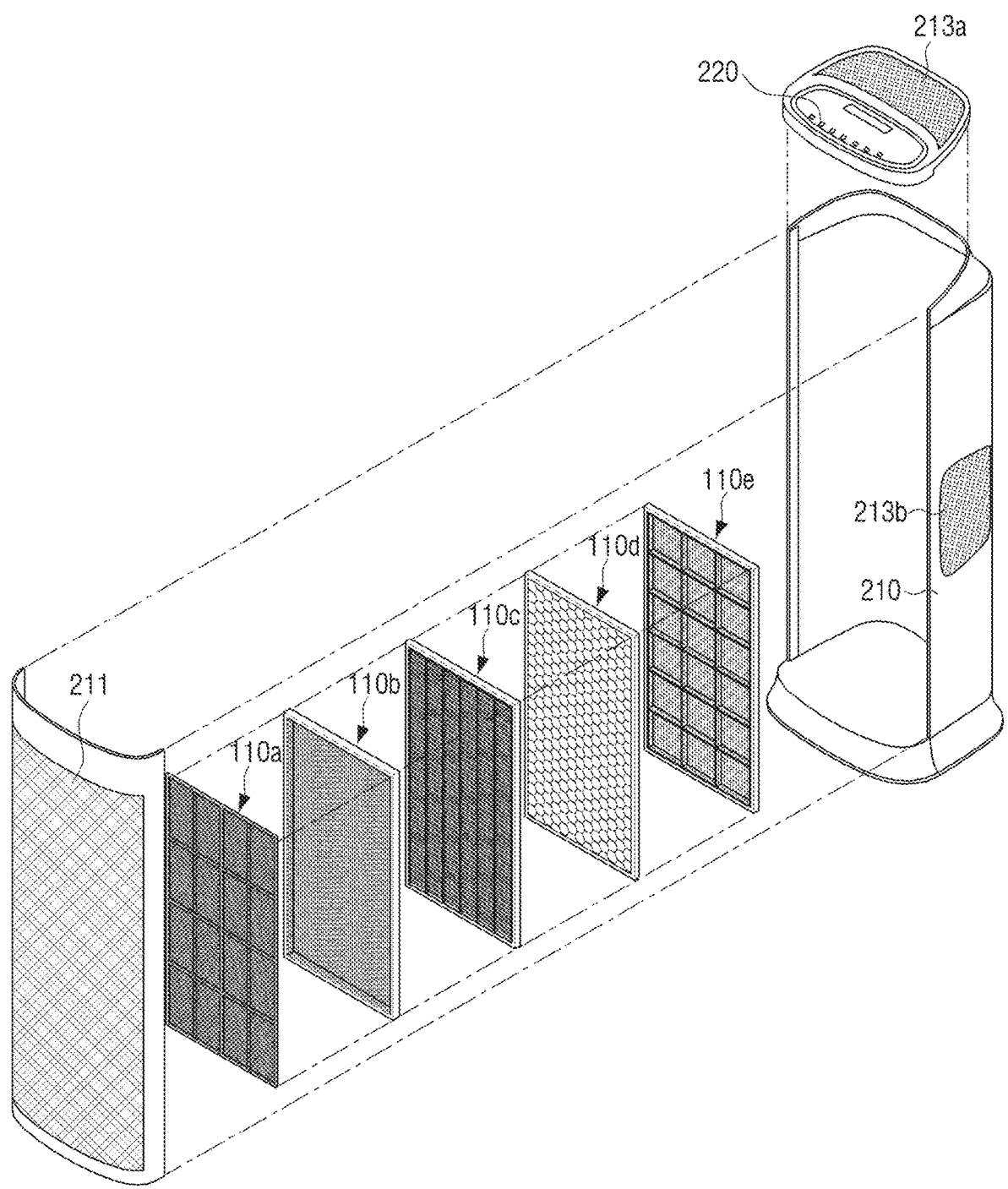

FIG. 2 is a view illustrating an exterior according to an embodiment and FIG. 3 is a view illustrating an interior according to an embodiment.

Referring to FIG. 2, the air purifier 1000 may include a main body 210 forming an outer appearance, an inlet 211 for sucking air from an indoor space, an outlet 213a, 213b through which introduced and purified air is discharged, an inputter 220, and a display 260 for displaying an operation state of the air purifier 1000.

The inputter 220 may include a button for inputting various control information related to the air purifier 1000 such as a power button for turning on or turning off the power of the air purifier 1000, a timer button for setting a driving time of the air purifier 1000, and a locking button for limiting operation of the inputter to prevent erroneous operation of the inputter. Each input button may be a push switch for generating an input signal through the pressing of a user, a membrane switch, a touch switch for generating an input signal through a touch of a part of the body of the user, a touch screen, a touch button, or the like.

If the inputter 220 employs a touch switch type, the inputter 220 may be integrally implemented with the display 260.

The display 260 may display information on the status of the air purifier 1000. For example, information about the contamination of the filter in the air purifier 1000, information about the time of replacement of the filter, information about the activity currently in progress (for example: information about the air quality sensing step or the filtering step, information about the direction of air movement) can be displayed. Alternatively, according to another embodiment, such information may be provided in an external device, such as a smartphone, in communication with the air purifier 1000.

FIG. 3 is a schematic exploded perspective view of the air purifier 1000 according to an embodiment.

Referring to FIG. 3, the air purifier 1000 may include a first dust filter 110a, a second dust filter 110b, a harmful gas filter 110c, a deodorizing filter 110d, and a third dust filter 110e inside the main body 210. The order of placement of the filters may be as shown in FIG. 3, and may be disposed in a different order. The number of filters is not limited to the number shown in FIG. 3. Some of the filters may be omitted according to an embodiment, and a suitable filter of a level that is obvious to those skilled in the art may, though it is not illustrated, may be further included in the air purifier 1000.

The first dust filter 110a, the second dust filter 110b, and the third dust filter 110e are filters for filtering dust, and the first dust filter 110a, the second dust filter 110b, and the third dust filter 110e are the same or different from each other. For example, the first dust filter 110a is for the use of filtering comparatively large life dust, the second dust filter 110b is for the use of filtering medium-size dust, and the third dust filter 110e is for the use of filtering fine dust.

The harmful gas filter 110c is for the use of removing harmful gas and is divided into an absorption filter and a decomposition filter, and the absorption filter may be an activated carbon, activated alumina, or the like, and the decomposition filter may be a filter to which low temperature plasma type, photo catalysis type, or the like, is applied.

The filter to which low temperature plasma type is applied generates plasma by a special electricity discharge method, and may remove not only particles but also most of the harmful gas substances such as VOCs, NOx, CFCs with bad smell by the electrons and reaction activation species therefrom.

The photocatalytic filter induces a chemical reaction due to light energy to remove harmful organic substances, hydrogen sulfide, ammonia, NOx, SOx, or the like in the air, and can remove them by charging dust or the like with the generated photoelectrons, and can sterilize various pathogens and bacteria existing in the air. If the harmful gas filter 330 is a filter to which the photocatalytic method is applied, a light source unit such as a light emitting diode (LED) lamp may be additionally included in the air purifier 1000 to generate a photocatalytic reaction. The light source portion may emit light having a wavelength in a range suitable for causing a photocatalytic reaction. For example, the light source unit may emit light having a wavelength range such as white light, red light, green light, blue light, ultraviolet rays, visible rays, infrared rays, or the like.

The deodorizing filter 110d is a filter for removing odors and is divided to, for example, an adsorption filter and a decomposition filter, and the adsorption filter can be activated carbon, activated alumina, or the like, and the decomposition filter can be a filter to which a low-temperature plasma method, a photocatalyst method, or the like is applied.

Although internal configurations of the air purifier 1000 are briefly illustrated and only filters are illustrated in FIG. 3 to facilitate understanding, various other components may be included. For example, in the air cleaning apparatus 1000 of FIG. 3, the processor 130 and the driving unit 120 of FIG. 1 may be disposed, and a fan for inducing the flow of air through the filter may be disposed. In addition, a sensor, such as a gas sensor, a dust sensor, an environmental sensor, or the like, may be disposed within the air purifier 1000. The processor 130 may control the driving unit 120 such that at least one of the plurality of filters 110a to 110d is disposed in an air passage depending on the gas state.

FIGS. 4 to 7 merely illustrate the filters within the air purifier 1000 for convenient description, but as described above, the driving unit 120 may move the filters of FIGS. 4 to 7 by the control of the processor 130.

Figure 4:
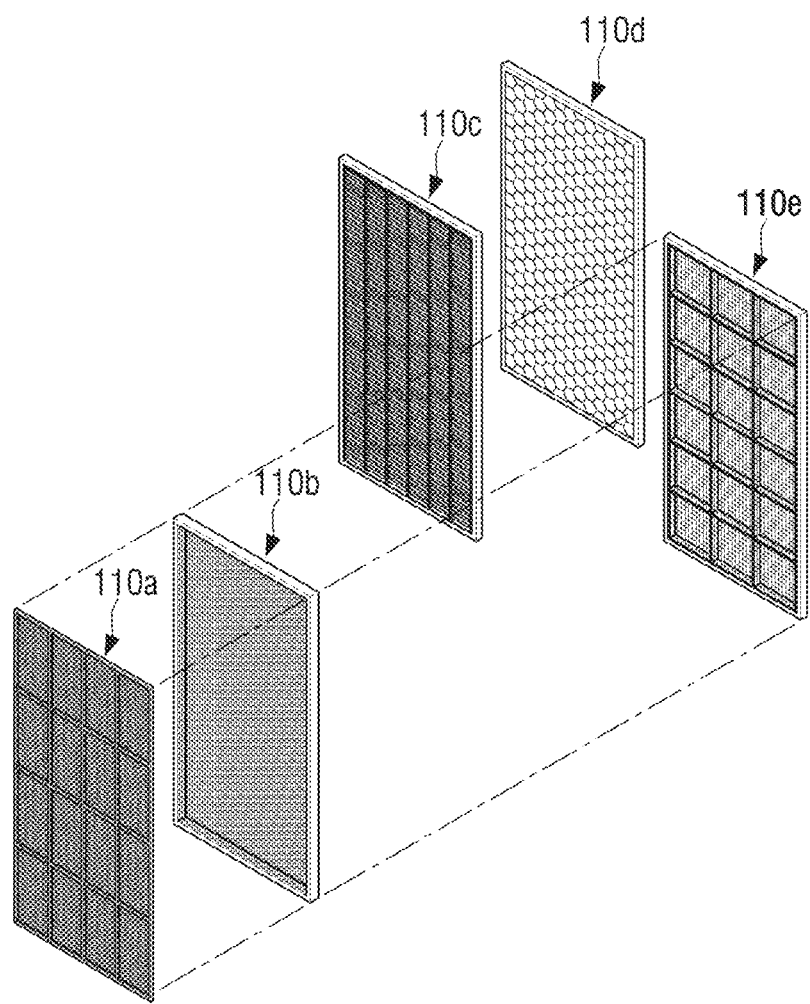
FIGS. 4 to 12 are views to describe various examples of a filter movement in an air purifier.

FIG. 4 illustrates a disposition state of a plurality of filters 110a to 110e in a case where there is a necessity to remove dust in the air state, and there is no need to remove harmful gas and odor generation gas. The arrows show the air passage direction in the air purifier 1000.

Referring to FIG. 4, the processor 130 may control the driving unit 120 to dispose the first dust filter 110a, the second dust filter 110b, and the third dust filter 110e in the air passage, and dispose the harmful gas filter 110c and the deodorizing filter 110d at the outside of the air passage.

Figure 5:
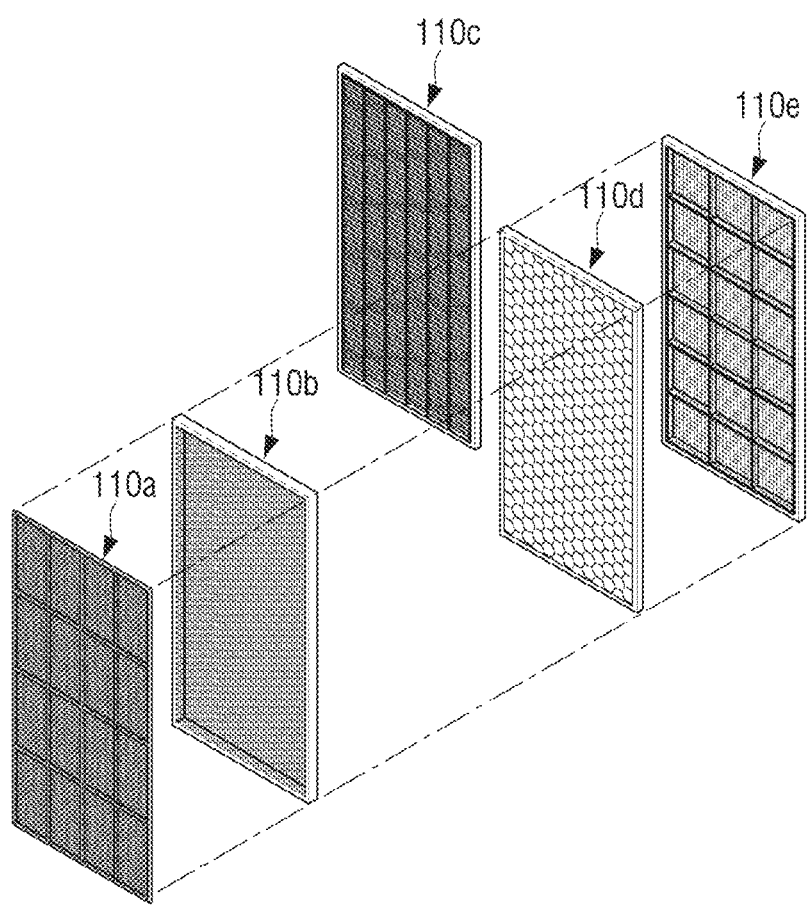

FIG. 5 illustrates a disposition state of a plurality of filters 110a to 110e in a case where there is a necessity to remove dust and odor generation gas in the air state, and there is no need to remove harmful gas.

to FIG. 5, the processor 130 may control the driving unit 120 to dispose the first dust filter 110a, the second dust filter 110b, the deodorizing filter 110d, and the third dust filter 110e in the air passage, and dispose the harmful gas filter 110c at the outside of the air passage.

Figure 6:
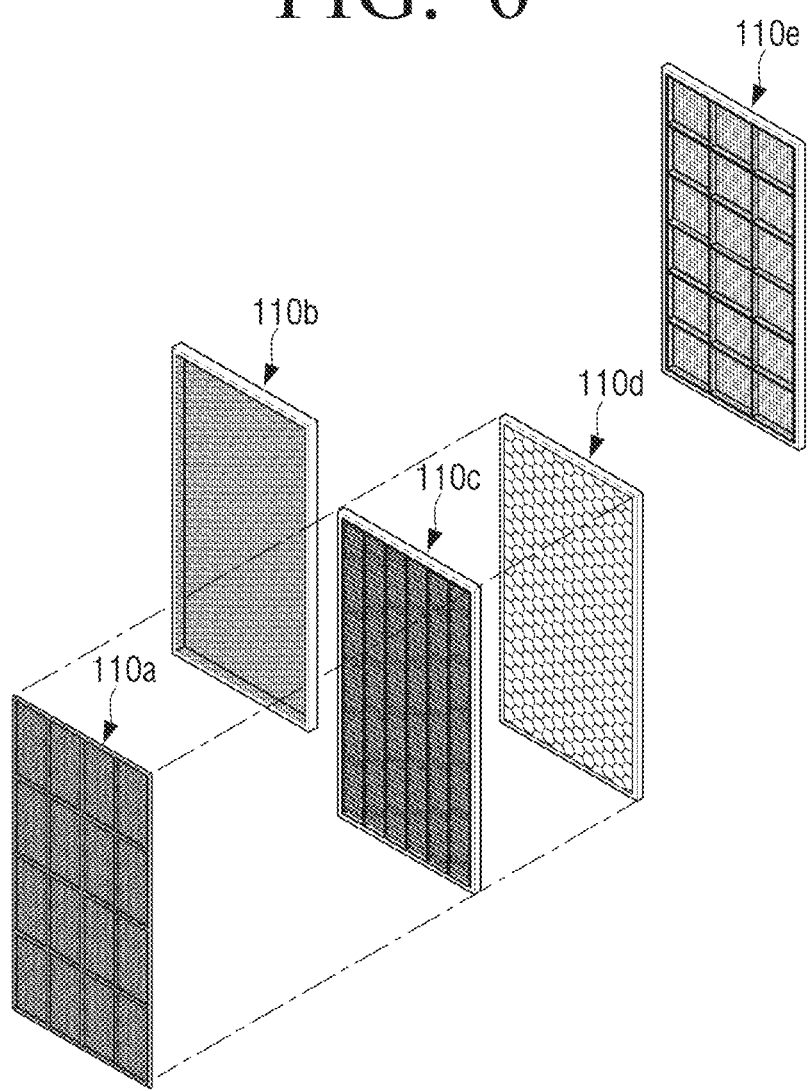

FIG. 6 illustrates a disposition state of a plurality of filters 110a to 110e in a case where there is a necessity to remove odor generation gas and harmful gas in the air state, and there is no need to remove dust.

Referring to FIG. 6, the processor 130 may control the driving unit 120 to dispose the first dust filter 110a, the harmful gas filter 110b, and the deodorizing filter 110d are disposed in the air passage and the second dust filter 110b and the third dust filter 110e are disposed outside the air passage. Even in the case where dust is not necessarily removed, in order to prevent contamination of the harmful gas filter 110b and the deodorizing filter 110d, the first dust filter 110a that may filter life dust (hair of an animal, or the like) of a comparatively large particle may be disposed in the air passage to prevent contamination of the harmful gas filter 110b and the deodorizing filter 110d.

Figure 7:
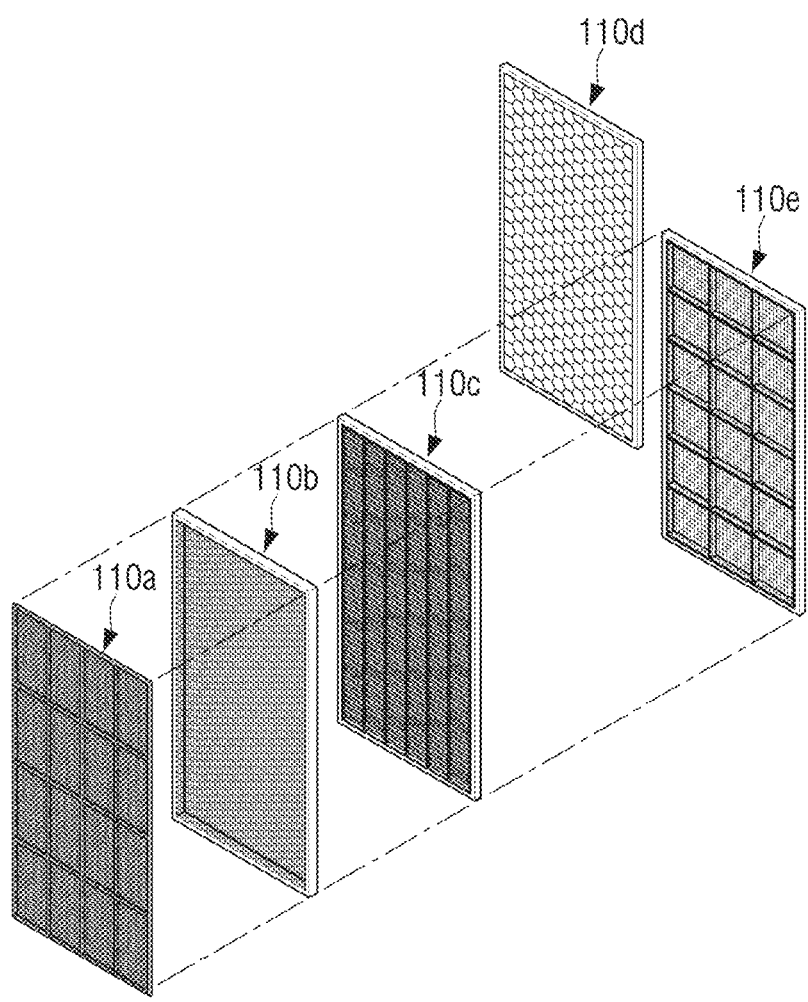

FIG. 7 illustrates a disposition state of a plurality of filters 110a to 110e in a case where there is a necessity to remove dust and harmful gas in the air state, and there is no need to remove the odor generation gas.

Referring to FIG. 7, the processor 130 may control the driving unit 120 to dispose the first dust filter 110a, the second dust filter 110b, the harmful gas filter 110c, and the third dust filter 110e in the air passage, and dispose the deodorizing filter 110d outside the air passage.

An arrangement of a filter may be diverse according to various circumstances, in addition to the description of FIGS. 4 to 7.

For example, the air purifier 1000 may include the harmful gas filter and the deodorizing filter, and the processor 130 may control the driving unit 120 to dispose, when a type of the gas identified based on the sensing value of the gas sensor is harmful gas, the harmful gas filter in the air passage, and dispose the deodorizing filter outside the air passage.

As a still another example, the air purifier 1000 may include a harmful gas filter and a deodorizing filter, and the processor 130 may control the driving unit 120, when the type of gas that is identified based on the sensing value of the gas sensor is the gas that generates odor and is not harmful, to dispose the deodorizing filter in the air passage, and dispose the harmful gas filter outside the air passage.

As a still another example, the air purifier 1000 may include a plurality of dust filters, and the processor 130 may control the driving unit 120 to dispose the dust filter in the number corresponding to the dust amount that is identified based on the sensing value of the dust sensor in the air passage.

The arrangement of a filter may be identified according to the air state that is identified using the sensor, and according to a still another embodiment, the arrangement may be identified by the user's manipulation.

According to an embodiment, the air purifier 1000 may operate in a plurality of air purification modes, or may receive selection of any one of the plurality of air purification modes from a user. For example, referring to FIG. 2, the inputter 220 may receive a user input to select any one of the plurality of air purification modes.

The processor 130 may control the driving unit 120 according to an air purification mode that is selected through the inputter 220.

According to an embodiment, a plurality of air purification modes which the air purifier 1000 is operable may include a cleaning mode, a cooking mode, a rapid purification mode, a ventilation mode, or the like.

The cleaning mode is a mode for removing dust that is generated during cleaning, and when the cleaning mode is selected, the processor 130 may control the driving unit 120 to dispose the filters as described with reference to FIG. 4.

The cooking mode is a mode for removing odor that is generated while cooking and making a clean cooking environment, and when the cooking mode is selected, the processor 130 may control the driving unit 120 to dispose the filters as described with reference to FIG. 5.

The rapid purification mode is a mode in which another filter such as the dust filter is not used, so that air can rapidly pass through the air purifier 1000 in order to rapidly remove harmful gases such as formaldehyde, ethylene, toluene, or the like, and odor generation gas, and the processor 130 can control the driving unit 120 such that the filters are arranged as described with reference to FIG. 6, if the rapid purification mode is selected.

The ventilation mode is a mode for removing harmful gas and dust which enter from the outside in a situation of opening window to remove indoor odor. When the ventilation mode is selected, the processor 130 may control the driving unit 120 to dispose filters as described with reference to FIG. 7, for example.

According to various embodiments, the plurality of filters 110 may be implemented to have a variety of movements. For example, as shown in FIGS. 4 to 7, the plurality of filters 110 may move in an upward or downward direction. In this case, the driving unit 120 can move the remaining filters except for at least one of the plurality of filters 110 upward or downward under the control of the processor 130. The movement of the filter in the upward and downward directions is merely an example, and the filters may move and rotate in various directions such as left, right, diagonal directions, or the like.

Figure 8:
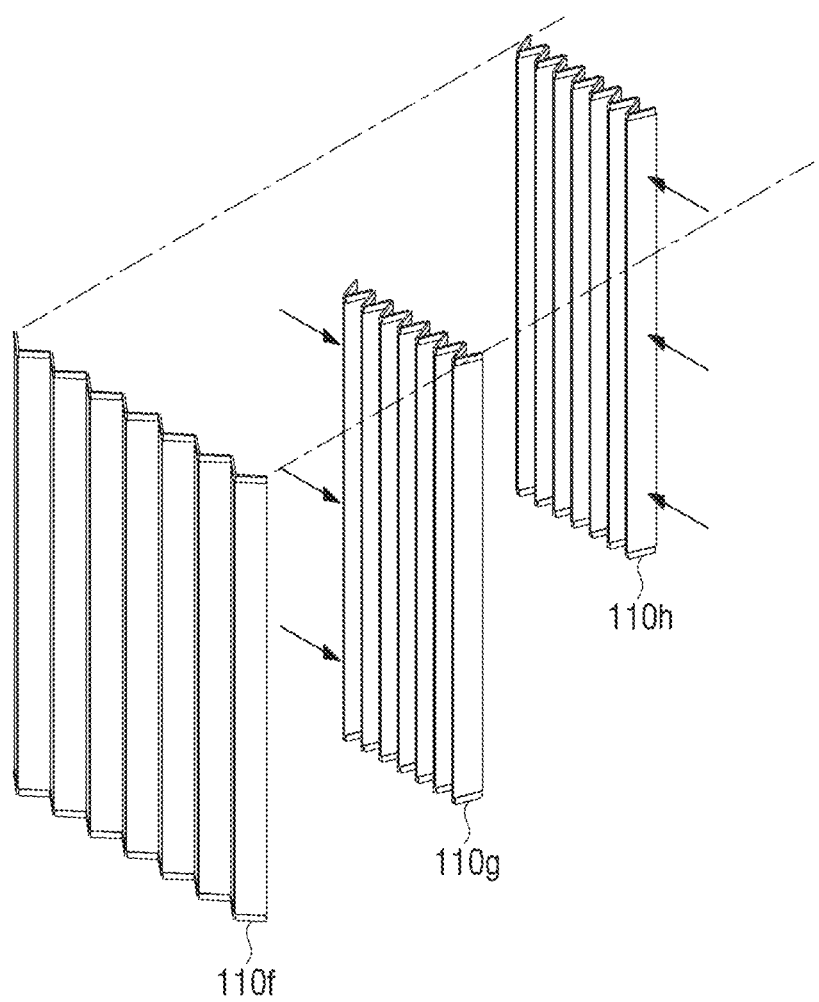

According to still another embodiment, the plurality of filters 110 may be filters capable of folding and unfolding, and the driving unit 120 may unfold at least one filter among the plurality of filters 110 and fold remaining filters according to control of the processor 130. FIG. 8 is a view to describe an example in which the filter is folded and unfolded.

Referring to FIG. 8, the air purifier 1000 may include a plurality of filters 110f, 110g, and 110h having a plurality of bending. The driving unit 120 may individually fold and unfold the plurality of filters 110f, 110g, and 110h. In this case, the driving unit 120 may fold a plurality of filters 110f, 110g, and 110h in different directions. For example, referring to FIG. 8, the filter may be folded in a right direction such as the second filter 110g, and that the filter may be folded in a left direction such as the third filter 110h.

As such, in order to implement folding and unfolding the filter, for example, the driving unit 120 may include a connecting member that is connected to an upper end or a lower end of each of the plurality of filters 110f, 110g, and 110h and a motor connected to the connecting member, and the driving unit 120 may fold the filter by pulling the connecting member using a rotation movement of the motor and unfold the filter by releasing the pulled connecting member.

Figure 9:
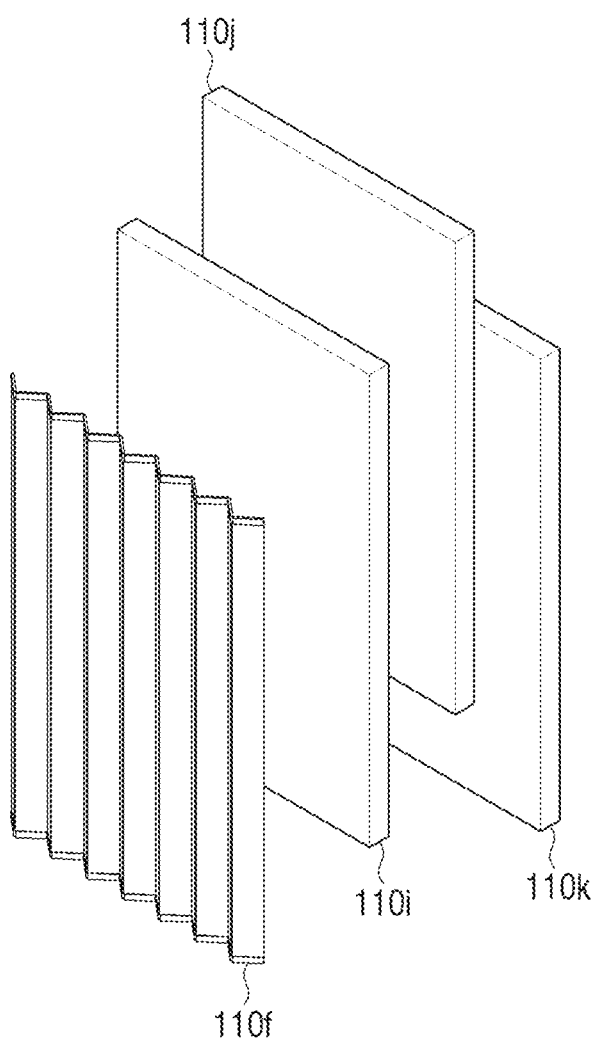

According to a still another embodiment, a part of the plurality of filters 110 in the air purifier 1000 may be implemented to have a movement that is different from others. FIG. 9 is a view to describe an example of the embodiment. Referring to FIG. 9, a first filter 110f is a filter that is capable of folding or unfolding movement, and the second to fourth filters 110i, 110j, and 110k may be filters capable of moving in an upward or downward direction.

According to still another embodiment, the plurality of filters 110 may move along the circular path within the air purifier 1000, and the driving unit 120 may dispose at least one filter among the plurality of filters 110 in a position that is perpendicular to a direction of passing through air in the circular path according to control of the processor 130.

In this case, a plurality of circular paths through which the plurality of filters 110 individually move are provided, and the plurality of circular paths may include the first circular path and a second circular path surrounding the first circular path.

An embodiment in which a filter moves along the circular path will be described with reference to FIGS. 10 and 11.

Figure 10:
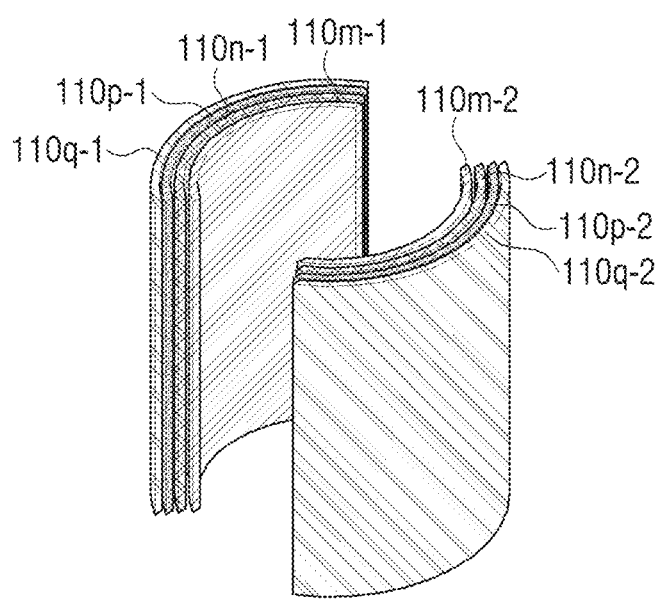

FIG. 10 illustrates an arrangement of a plurality of filters according to an embodiment.

Figures 11A, 11B, 11C:
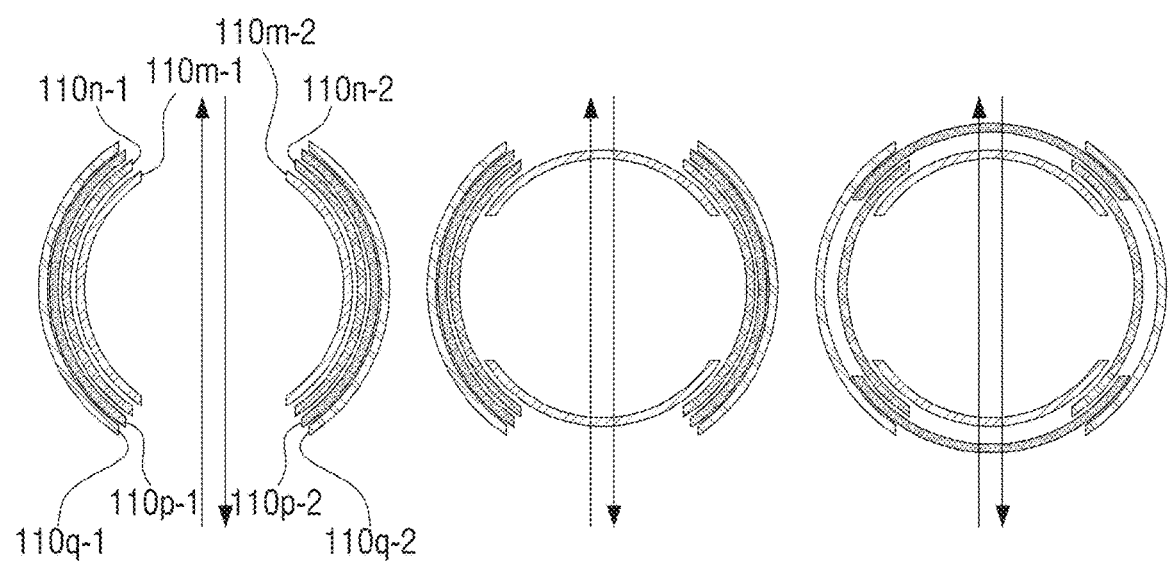

Referring to FIG. 10, a plurality of filters 110m-1, 110n-1, 110p-1, 110q-1, 110m-2, 110n-2, 110p-2, 110q-2 are arranged in a cylinder shape. A plurality of filters 110m-1, 110n-1, 110p-1, 110q-1, 110m-2, 110n-2, 110p-2, 110q-2 may move along a circular path. FIG. 10 shows a state in which no filter is disposed in the air passage. FIG. 11A illustrates the arrangement of FIG. 10 viewed from above. The arrows indicate the direction through which the air passes. FIG. 11B and FIG. 11C illustrate a state in which some filters among a plurality of filters are disposed in the air passage. Referring to FIG. 11B, the driving unit 120 may rotate the first filter 110m-1 and the second filter 110m-2 along the circular path and dispose the filters at a position that is perpendicular to the direction of passing air. Referring to FIG. 11C, the driving unit 120 may rotate the first filter 110m-1, the second filter 110m-2, the third filter 110p-1, and the fourth filter 110p-2 along a circular path to be disposed at a position perpendicular to the direction in which the air passes. The first filter 110m-1 and the second filter 110m-2 move along the first circular path, and the third filter 110p-1 and the fourth filter 110p-2 can move along a second circular path surrounding the first circular path.

As such, in order to implement the movement of rotating the filter along the circular path, for example, the driving unit 120 may include a roller that is disposed in a lower end of each filter, and may move the filter by moving the roller in the circular path.

Figure 12:
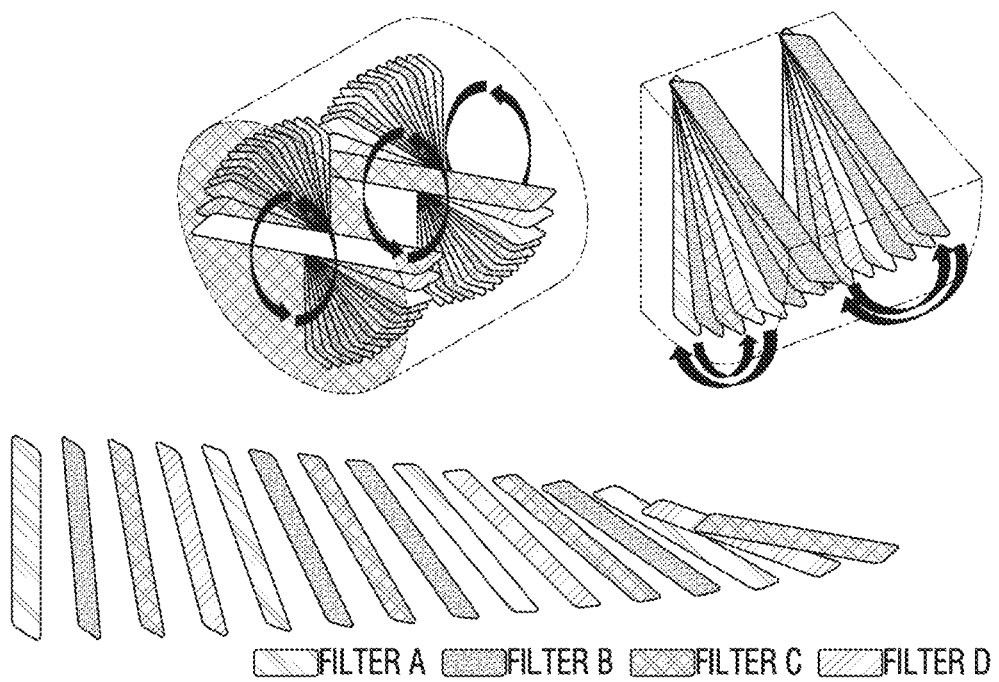

FIG. 12 illustrates an arrangement of a plurality of filters according to another embodiment. Referring to FIG. 12, a plurality of filters may be placed in the air passage as if they are spread out like a fan. As illustrated on the left side of FIG. 12, a plurality of filters may be unfolded with reference to the center of the filters, and the left, and may be unfolded with reference to a plurality of filter ends, as illustrated on the right. Depending on the current air condition, the amount of rotation of filter A, filter B, filter C, and filter D can be adjusted.

The filters in the air purifier 1000 may be implemented to be all movable, and some of them may be fixed, and the rest may be implemented to be movable. In the latter case, the fixed filter may be the dust filter.

According to the embodiments described above, only necessary filters may be disposed in the air passage, and thus, noise of the air purifier which may be generated while the air is passing through unnecessary many filters may be reduced.

According to still another embodiment, a noise canceling technique may be used to further reduce the noise of the air purifier 1000. There are a passive noise cancelling (PNC) method and an active noise cancelling (ANC) method in the noise cancellation technique. For example, a sound absorbing material may be disposed inside the air purifier 1000 for the PNC. In the ANC method, for example, the air purifier 1000 may include a microphone and a speaker, and the processor 130 may control the speaker to output a sound of the waveform to cancel the waveform of the sound collected via a microphone. That is, noise can be eliminated by outputting a negative waveform and an opposite sound wave through a speaker. In this way, it is possible to implement the air purifier 1000 without noise generated by the air passing through the filter.

Figure 13:
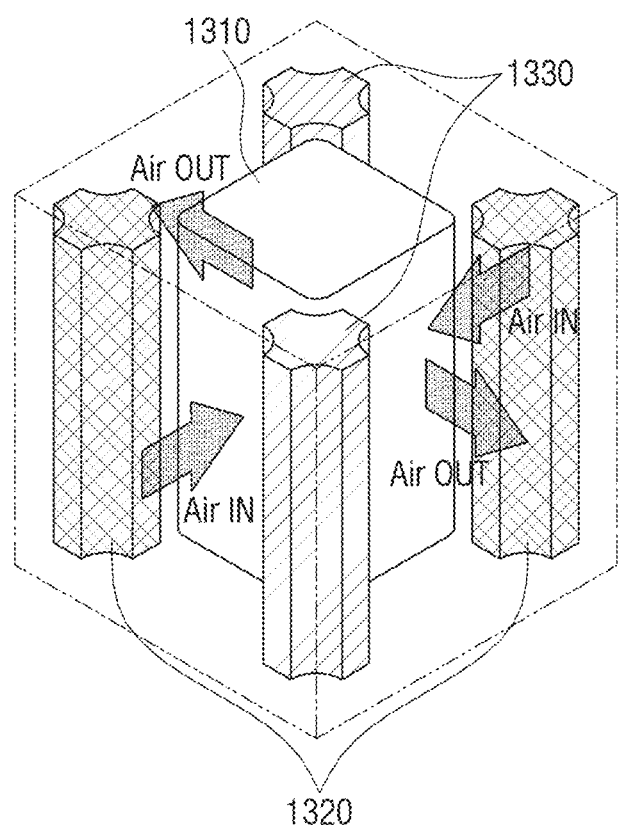
FIGS. 13 and 14 are views to describe an air purifier including a cyclone and a circulator according to various embodiments.

FIG. 13 illustrates an interior of the air purifier 1000 according to still another embodiment.

Referring to FIG. 13, the air purifier 1000 includes a filter cartridge 1310 including a plurality of filters, a cyclone 1320, and a circulator 1330.

The filter cartridge 1310 is a configuration in which the plurality of filters may be mounted. For example, a plurality of filters that may move in an upward direction or a downward direction as illustrated in FIGS. 4 to 7 may be disposed in the cartridge.

The cyclone 1320 is a configuration to rotate and suck air. The circulator 1330 is a configuration to rotate for discharging purified air to the outside. The circulator 1330 may discharge the purified air to an upper side of the air purifier 1000. By discharging air in an upward direction, convection current of air may be stimulated.

Figure 14:
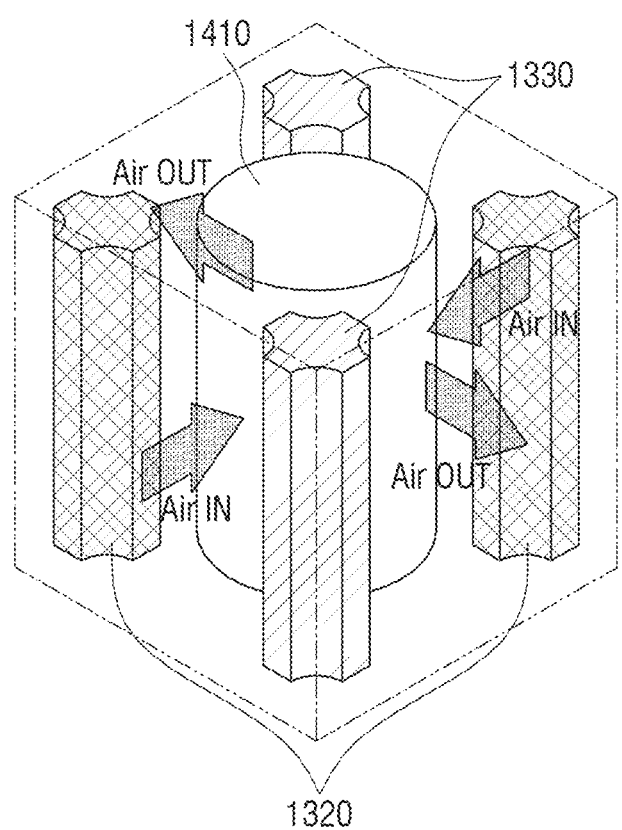

FIG. 14 illustrates the inside of the air purifier 1000 according to still another embodiment. The air purifier 1000 of FIG. 14 includes a filter cartridge 1410 including a plurality of filters, a filter cartridge 1410, the cyclone 1320, and the circulator 1330.

The filter cartridge 1410 is a configuration in which a plurality of filters may be disposed. For example, a plurality of filters which may move along the circular path as described with reference to FIGS. 10 to 11 may be disposed in the filter cartridge 1410. The cyclone 1320 and the circulator 1330 are as described in FIG. 13.

The air purifier 1000 according to an embodiment may be implemented as an assembly-type device which may add a function if there is any desired function. This will be described with reference to FIGS. 15 to 17.

Figure 15:
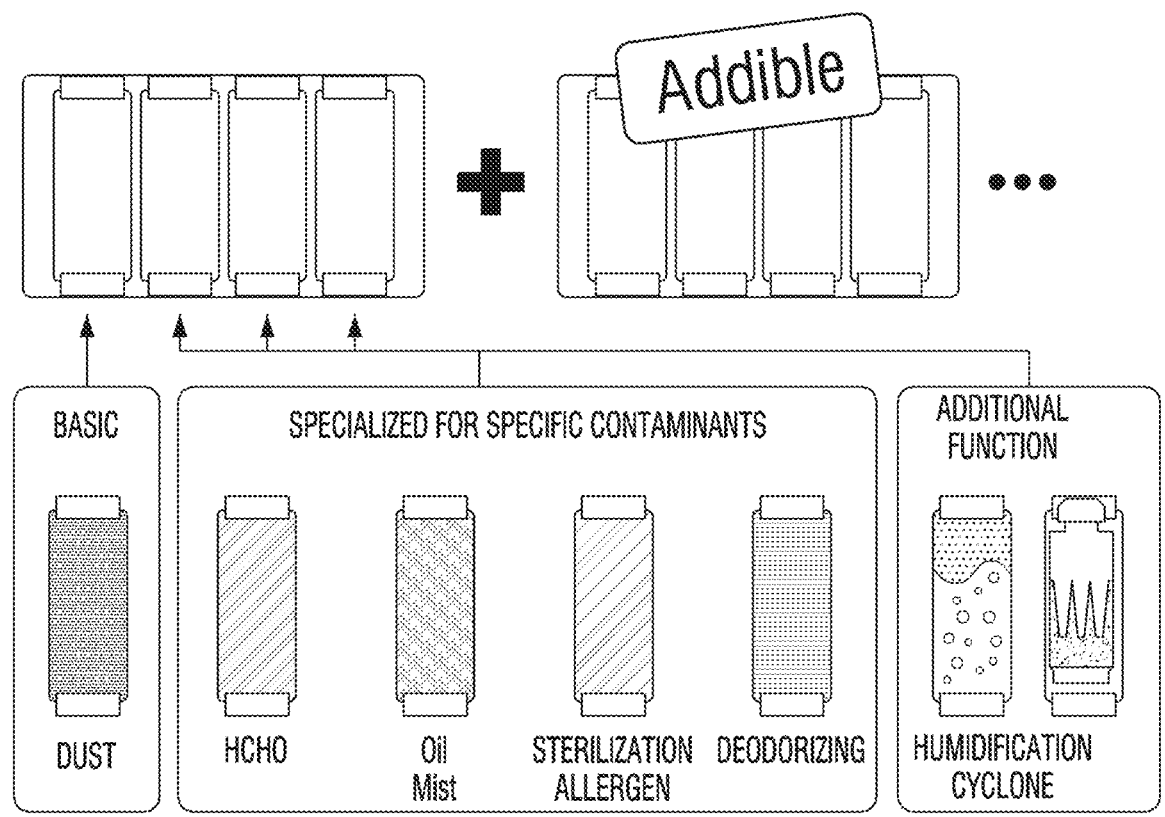
Figure 16:
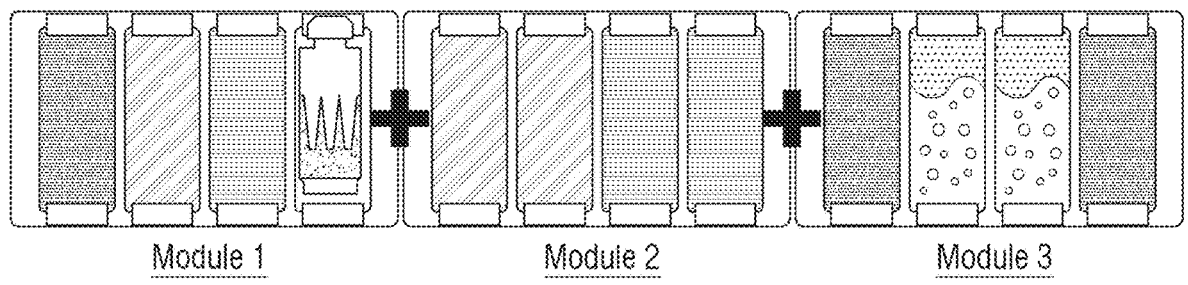

Referring to FIG. 15, the air purifier 1000 according to an embodiment has a dust filter as a basic configuration and can be configured by adding a filter specialized to a specific contamination source. A configuration having a humidification function as well as a filter can be added. For example, a configuration having a general humidification function, a configuration having a cyclone humidification function, may be added. In this manner, several configurations may form one module and a plurality of such modules can be connected to each other. FIGS. 16 to 17 illustrate that several modules may be connected. Each module may have a different combination of configurations. FIG. 17 illustrates an air purifier in which a structure such as that described in FIGS. 13 to 14 can be assembled, and the module can be assembled in a form capable of being stacked in an upward direction as shown in FIG. 17.

By combining a plurality of modules in this way, a customized air purifier having only the function desired by the user can be provided to enable a customized response according to the use space by the expansion of the module configuration. The purpose of combining these modules can be used for interior purposes as well as diversification of functions.

Figure 18:
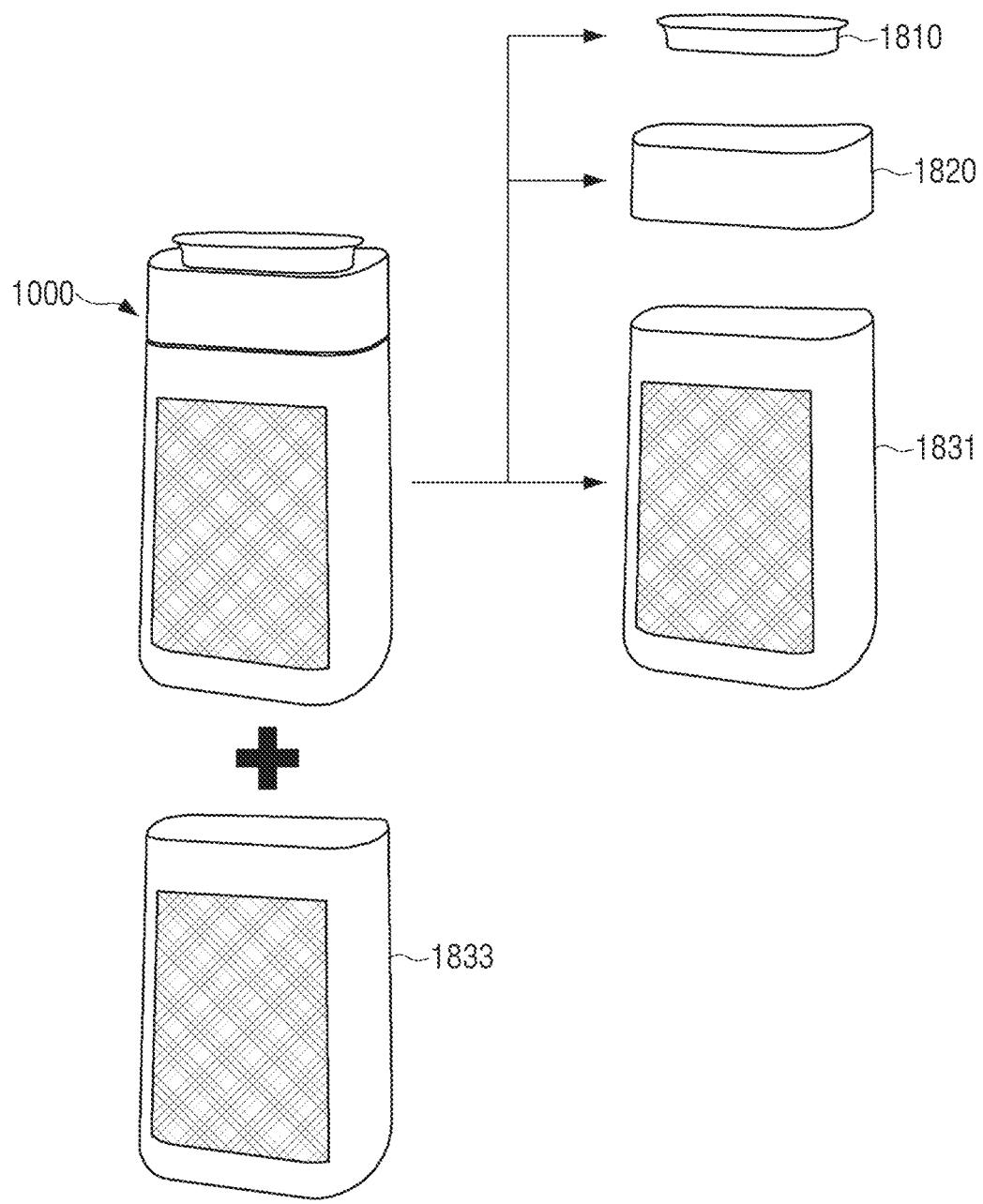

FIG. 18 is a view to describe an air purifier composed of a plurality of units according to an embodiment.

The air purifier 1000 may include a sensor unit 1810, a humidification unit 1820, and a purification unit 1831, or the like. Various units may be additionally included according to addition of a function, in addition to the illustrated sensor unit 1810, humidification unit 1820, purification unit 1831, or the like.

The sensor unit 1810 may include at least one of the gas sensor and the dust sensor. The user may separate the sensor unit 1810 and measure the air state at a desired space.

The humidification unit 1820 is a configuration which has a humidification function, and the user may separate the humidification unit 1820 and humidify at the desired space.

The purification unit 1831 that is a configuration for air purification may include a plurality of filters. A user may select a desired filter and configure the purification unit 1831. In addition, the user may separate only the purification unit 1831 and purify air at a desired space. The purification unit 1831 may perform not only the air purification function but also circulator function for air circulation.

In the air purifier 1000 illustrated in FIG. 18, the additional purification unit 1833 that is identical with the purification unit 1831 as described above may be additionally assembled.

According to one embodiment, the basic unit of the units forming the assembly-type air purifier 1000 can be supplied with power through an electric cord, and an additional unit that may be assembled to the base unit can be supplied with power through a battery. The basic unit may be any of the units included in the air purifier 1000. For example, the purification unit 1831 may be a basic unit, the sensor unit 1810 and the humidification unit 1820 may be additional units. The additional unit may be supplied with power through the battery when present by itself, and may be supplied with power through the basic unit when assembled to the base unit.

Figure 19:
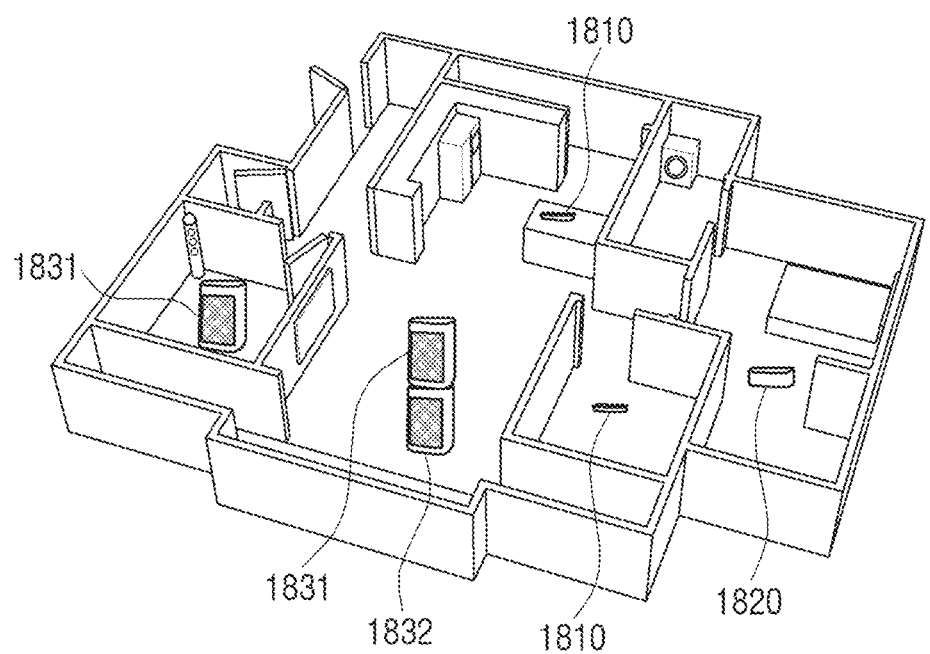
FIG. 19 is a view illustrating a dispersed disposition format of the modular air purifier according to an embodiment.

FIG. 19 is a view to describe a scenario that several units which may form an air purifier are disposed in different spaces.

Referring to FIG. 19, units may be disposed according to different purposes for each room in the house. For example, for a child's room requiring humidification, the humidification unit 1820 may be disposed, for a kitchen and a study room, the sensing unit 1810 may be disposed, and in a main room, the purification unit 1831 may be disposed. At a living room with a comparatively wider space, two purification units 1831 and 1832 may be assembled and disposed.

Each unit may communicate with each other when having a communication function. For example, a sensing result that is obtained through the sensing unit may be transferred to the purification unit, and the purification unit may adjust the purification level according to the sensing result, or control a movement of a plurality of filters in the purification unit.

Figure 20:
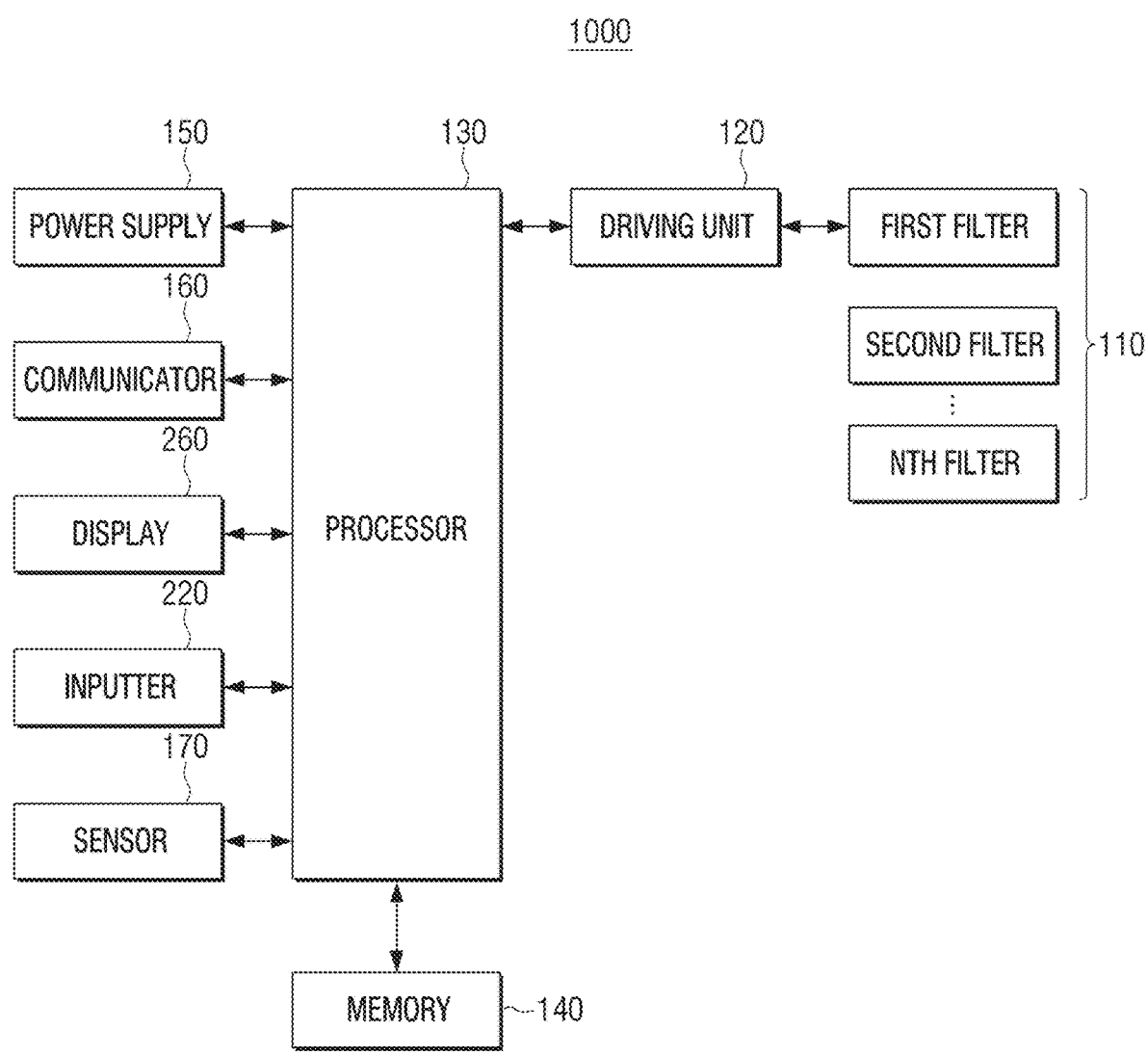
FIG. 20 is a view to describe a specific configuration of an air purifier according to an embodiment.

FIG. 20 is a view to describe a specific configuration of the air purifier 1000 according to an embodiment.

Referring to FIG. 20, the air purifier 1000 may include a plurality of filters 110, the driving unit 120, the processor 130, the memory 140, a power supply 150, a communicator 160, a sensor 170, a display 260, and an inputter 220. Depending on the embodiment, some of the configurations may be omitted, and although not shown, configurations of a level that is obvious to those skilled in the art may be further included in the air purifier 1000.

Even if the configurations are omitted, the configurations that overlap with the aforementioned configurations among the configurations of the air purifier 1000 may be replaced with the description about the aforementioned configurations.

The power unit 150 may supply power to the internal process and a circuit. The power unit 150 may be implemented as a battery, an adapter, or the like.

The communicator 160 is configured to perform communication with various external devices and may be connected to an external device through a wireless communication (for example, Z-wave, internet protocol version 4 (IPv4) over low-power wireless personal area networks (4LoWPAN), radio frequency identification (RFID), long-term evolution device to device (LTE D2D), Bluetooth low energy (BLE), general packet radio service (GPRS), Weightless, Edge Zigbee, ANT+, near field communication (NFC), infrared data association (IrDA), digital enhanced cordless telecommunications (DECT), wireless local area network (WLAN), Bluetooth, WiFi, Wi-Fi Direct, global system for mobile communications (GSM), universal mobile telecommunications system (UMTS), long-term evolution (LTE), wireless broadband (WiBRO), cellular (3/4/5G), ultrasonic wave, or the like) as well as local area network (LAN) and an Internet network. The communicator 160 may include various communication chips such as a Wi-Fi chip, a Bluetooth chip, and a wireless communication chip.

The sensor 170 may include at least one of a dust sensor, a gas sensor, and an environmental sensor (a presence sensor, motion sensor, noise sensor, ultraviolet sensor, temperature sensor, humidity sensor, or the like). The sensor 170 may be separate from the air purifier 1000. The detachable sensor 170 may communicate with the air purifier 1000 with its own communication unit to transfer the sensing value to the air purifier 1000.

The memory 140 may include, for example, an embedded memory or an external memory. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD).

The external memory may include a flash drive, for example, compact flash (CF), secure digital (SD), micro secure digital (micro-SD), mini secure digital (mini-SD), extreme digital (xD), multi-media card (MMC), a memory stick, or the like. The external memory may be connected to the air purifier 1000 functionally and/or physically through various interface.

The memory 140 may store computer executable instructions, and the processor 130 may perform functions of various embodiments described in this disclosure by executing a computer executable instruction stored in the memory 140.

Information on criteria for determining the air condition may be stored in the memory 140. For example, if a particular source of contaminants is present above a certain concentration, reference information may be stored to identify that the air condition is a contaminated state, and the memory 140 may also store information regarding what kind of gas corresponds to which filter. The processor 130 may identify the air condition based on the sensing value obtained through the sensor 170 and the information stored in the memory 140 to identify which of the plurality of filters 110 is to be disposed in the air passage. For example, if it is identified that the gas type is ammonia or hydrogen sulfide based on the sensing value obtained through the sensor 170, the processor 130 may identify that the filter corresponding to ammonia or hydrogen sulfide is a deodorizing filter from the information stored in the memory 140, and may control the driving unit 120 so that the deodorizing filter is disposed in the air passage. As another example, if it is identified that the gas type is formaldehyde or toluene based on the sensing value obtained through the sensor 170, the processor 130 may identify that the filter corresponding to formaldehyde or toluene is a harmful gas removal filter from the information stored in the memory 140, and may control the driving unit 120 so that the harmful gas removal filter is disposed in the air passage. As still another example, if it is identified that the dust of 50 $\mu g/m^3$ is present based on the sensing value obtained through the sensor 170, the processor 130 can identify the type of dust filter and the number of dust filters required when the dust is 50 $\mu g/m^3$ is present, from the information stored in the memory 140, and controls the driving unit 120 on the basis of the identified dust filter, and dispose a predetermined type of dust filter and a predetermined number of dust filters in the air passage.

According to an embodiment, a notification of filter replacement timing may be provided to a user in consideration of different life expectancies of each filter. In this case, a degree of use of a filter may be considered as well, and notification for the replacement timing may be provided as well.

For this purpose, the memory 140 may store information on the lifetime of each of the plurality of filters 110 and usage history for each of the plurality of filters 110. For example, the memory 140 may store information about the history of each of the plurality of filters 110 disposed in the air passage. The memory 140 may store information about a period of time that each of the plurality of filters 110 is disposed in the air passage, and the processor 130 may update the information of the memory 140 by increasing a period of use of the corresponding filter when an event in which the filter is disposed in the air passage is generated. The processor 130 may provide a notification of the filter replacement to the user based on information about the filter usage history stored in the memory 140.

The memory 140 may store information about how long the plurality of filters 110 have been disposed in the air passage, and more specifically, when the filter is disposed in an air passage, may store information about at which order the filter has been disposed in the air passage. That is, when the filters are disposed in a front side in the air passage more, the more the contact of the contamination source is, and thus the life time can be quickly reduced, and the information about this can also be managed in the memory 140. For example, with reference to FIGS. 4 to 5, in the case of FIG. 4, the third dust filter 110e is disposed in the third of the air passage, and in the case of FIG. 5, the third dust filter 110e is disposed in the fourth of the air passage. As shown in FIG. 5, in the case where the third dust filter 110e is used as FIG. 4, the life of the third dust filter 110e may be more rapidly reduced, than the case when the third dust filter 110e is used as shown in FIG. 5. As described above, information on the arrangement order in the air passage is considered to identify the remaining life of each of the filters, and based on the determination, the user can more accurately provide with the notification of the filter replacement timing.

According to an embodiment, the notification for the filter replacement timing may be provided through the display 260. According to still another embodiment, the information on the filter replacement timing may be transmitted to an external device such as a smartphone through the communicator 160 and notification may be provided in the external device.

According to embodiments related to the aforementioned filter replacement timing, accurate replacement timing may be identified, and convenience of maintenance/repair according thereto may be improved.

The display unit 260 may be configured to display information, for example, a light emitting diode (LED), a liquid crystal display (LCD), or the like. According to one embodiment, the display 260 may include an LED that individually displays the selected state of each of the plurality of functions provided by the air purifier 1000. The term function is meant to encompass terms such as menus, modes (states), options, settings, and the like. The air purifier 1000 may include a plurality of air cleaning modes, and an LED corresponding to a selected one of the plurality of air clean modes may be turned on.

The display 260 may display a filter replacement notification. The display 260 may display information on the gas type that is obtained through the sensing value of the sensor 170.

The inputter 220 is configured to receive a user operation, and may be implemented in various forms such as a button, a touch pad, and a jog wheel, and a combination of the various types. The display 260 and the inputter 220 may be implemented as a touch screen capable of sensing a touch operation of a user. For example, the inputter 220 may receive a user manipulation to select any one of a plurality of air purification modes.

Instead of receiving a user manipulation through the inputter 220, it is possible to receive a signal for the user manipulation in the external device through the communicator 160.

Figure 23:
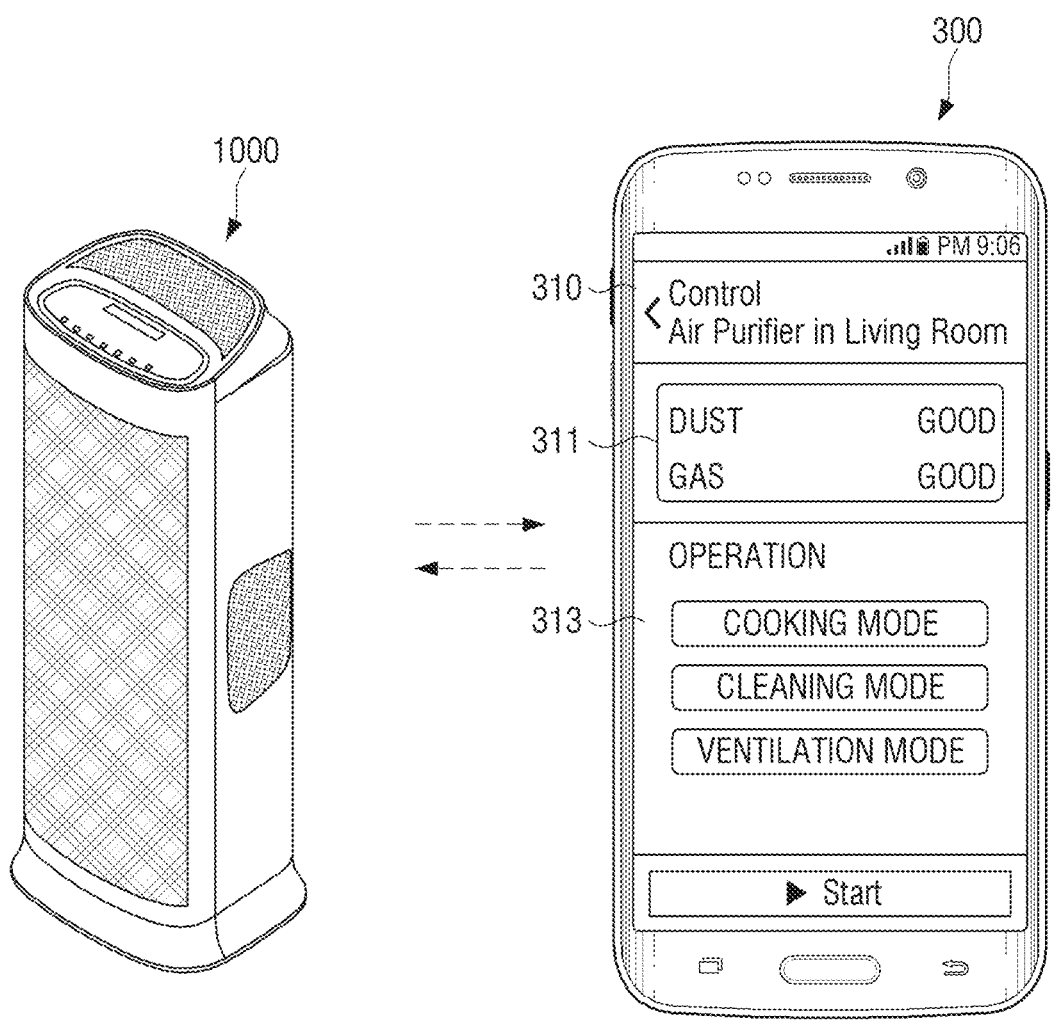
FIG. 23 is a view to describe a controlling method of an air purifier according to an embodiment.

FIG. 23 is a view to describe a controlling method of the air purifier 1000 according to an embodiment.

Referring to FIG. 23, the air purifier 1000 may communicate with the external device 300 through the communicator 160. The external device 300 may be an electronic device such as a smartphone, a tablet PC, or the like.

For example, an application may be executed in the external device 300 to control the air purifier 1000. Such applications may be distributed online via an application store (example: Play Store™). By executing an application in the external device 300, a UI background screen 310 for controlling, for example, the air purifier 1000 may be provided to the external device 300. In the UI screen 310, information 311 about an air state detected through the sensor 170 of the air purifier 1000, a driving mode selection menu 313, and the like may be provided. For example, the user may select one of a cooking mode, a cleaning mode, a ventilation mode, and the like through the UI screen 310, and when a signal corresponding to the user's selection is transmitted to the air purifier 1000, the air purifier 1000 may operate corresponding to the received signal.

According to another embodiment, the external device 300 may control the air purifier 1000 as it interacts with the air purifier 1000 using a messenger program. For example, the air purifier 1000 and the external device 300 can send and receive conversation messages via a message server. The air purifier 1000 may transmit, to a message server, a conversation message including information about the current operating mode, information about the air condition, information about the on/off state, information for filter replacement notification, or the like, via the communication unit 170, and the message server may transmit the same to the external device 300. The external device 300 may execute a messenger program and display a conversation message received from the air purifier 1000 through the message server. That is, a chat screen can be configured as if the air purifier 1000 is a conversation partner. When a user inputs a text for controlling the air purifier 1000 on the chat screen, the corresponding text may be displayed on the chat screen, and a conversation message including control information corresponding to the inputted text can be transmitted to the air purifier 1000 through the message server. The air purifier 1000 may perform an air purification operation corresponding to the control information included in the received conversation message. For example, if the user inputs a text "operate in a cooking mode" through a chat screen provided through the external device 300, the air purifier 1000 may operate in a cooking mode.

According to still another embodiment, the external device 300, which is capable of communicating with the air purifier 1000, may provide an AI-based service (for example, a voice recognition service, a secretary service, a search service, or the like), rather than simply providing an application. The AI agent may be executed by an existing general-purpose processor or a separate AI-only processor. The AI agent may provide an interactive service, such as a chatbot, and may provide a notification on state of the air purifier 1000 such as the filter replacement timing, or the like, on the messenger. In addition, a UI screen for a subsequent measure according to the state of the air purifier 1000 can be provided. For example, when a filter in the air purifier 1000 needs to be replaced, a UI screen including a link which for moving to a website for purchasing a filter can be provided, and a UI screen can be provided for selecting an operation mode of the recommended air purifier 1000 according to the air condition identified through the sensor 170. Alternatively, such an AI agent may be mounted on the air purifier 1000.

According to an embodiment, the processor 130 may include at least one of a data learning unit to train the AI model using the AI algorithm and a data recognition unit using the AI model.

The data learning unit may generate or train a data recognition model so as to have criteria for determining with which mode the air purifier 1000 is to operate. For example, the data learning unit may generate or train the data recognition model using data such as sensing values obtained from the sensor 170 or information received from another device (for example, a cleaner, a kitchen appliance, a smart phone, or the like) that is capable of communicating with the air purifier 1000 as the learning data.

The data recognition unit may use the trained data recognition model to identify the operation mode of the air purifier 1000. The data recognition unit may obtain predetermined data according to a predetermined criterion, apply the obtained data to the data recognition model as an input value, and identify an operation mode of the air purifier 1000 based on the predetermined data. The result value that is output by applying predetermined data to the data recognition model can also be used to update the data recognition model.

According to an embodiment, the operation mode of the air purifier 1000 may be identified by applying a sensing value obtained from a sensor, such as a gas sensor, a dust sensor, an environmental sensor (for example, a presence sensor, a motion sensor, a noise sensor, or the like), or data such as state information received from another device capable of communicating with the air purifier 1000 as the input data. The air purifier 1000 may operate according to the identified operating mode.

According to an embodiment, autonomous driving, monitoring function and automatic on/off function of the air purifier 1000 may be performed based on the user profile and usage base by using the AI system.

For example, the processor 130 can generate profile information of a user related to a life pattern of a user by applying, to the data recognition model, user movement information, user movement information, collected through the sensor 170 provided in the air purifier 1000 and a user terminal device such as a smart phone in communication with the air purifier 1000, and can identify an operation mode of the air purifier 1000 based on the profile information of the user. For example, if it is identified that the current time is the sleep time based on the profile information of the user, the air purifier 1000 may operate in the minimum purification mode so as to minimize noise during operation of the air purifier 1000.

The user profile information that is used to identify the operation mode of the air purifier 1000 may include information on a contaminant source in which a user has an interest, information on an operation mode, or the like, and the operation mode of the air purifier 1000 may be identified in reflection of the user preference by considering this information.

As a still another example, the operation mode of the air purifier 1000 can be identified in comprehensive view of whether the user is present indoors, or how is the room air condition. That is, for example, if the user is not present, the air purifier 1000 may not be unnecessarily operated. For example, the processor 130 may identify an operating mode by applying, to the data recognition model, a sensing value obtained from a gas sensor, a dust sensor, or the like, and a sensing value obtained from a sensor such as a presence sensor, a motion sensor, or the like, as input data.

As a still another example, the processor 130 may perform an on/off automatic control or idle mode/active mode automatic switching function of the air purifier 1000 based on a sensing value obtained from the sensor. For example, even when the air purifier 1000 is in the idle mode, the sensor 170 can be activated, and if it is identified that the air purification is necessary based on the sensing value obtained from the sensor 170, the air purifier 1000 in the standby mode can be automatically switched to the active mode.

According to an embodiment, when state information is received from the external device through the communicator 170, the processor 130 may automatically perform air purification operation related to the received status information.

For example, in a situation in which a lot of dust can be generated, for example, in a situation where a user uses a cleaner, the cleaner can transmit status information to inform the air purifier 1000 that cleaning is performed. The processor 130 may identify the mode of operation of the air purifier 1000 as an automatic dust removal mode by applying the status information received from the cleaner to the data recognition model, and may control the driving unit 120 to switch the air purifier 1000 to an activation mode if the air purifier 1000 is in an idle mode, and dispose a dust filter in the air passage.

As another example, in a situation where there is a lot of odor, for example, a user is cooking using an electric range, the electric range may transmit status information indicating that cooking has been performed to the air purifier 1000. By applying the state information received from the electric range to the data recognition model, the processor 130 can identify the operation mode of the air purifier 1000 in an automatic deodorization mode and control the driving unit 120 to switch the air purifier 1000 into an activation mode if the air purifier 1000 is in the standby mode and to dispose the deodorizing filter in the air passage.

According to still another embodiment, by applying a sensing value of the sensor 170 to the data recognition model as input data, an optimized mode can be selected for the removal of contaminants present in the air currently. For example, the processor 130 may apply a sensing value obtained through a sensor, such as a gas sensor, a dust sensor, or the like, to the data recognition model to identify the primary contaminants and identify the contamination level. Based on this, a type and number of filters may be identified for purifying air for the shortest time, and the identified type and number of filters may be disposed in the air passage.

In the above example, it has been described that the AI system is loaded in the air purifier 1000, but it is also possible that the system is loaded in the external server, and to control the air purifier 1000 by the external server.

Figure 21:
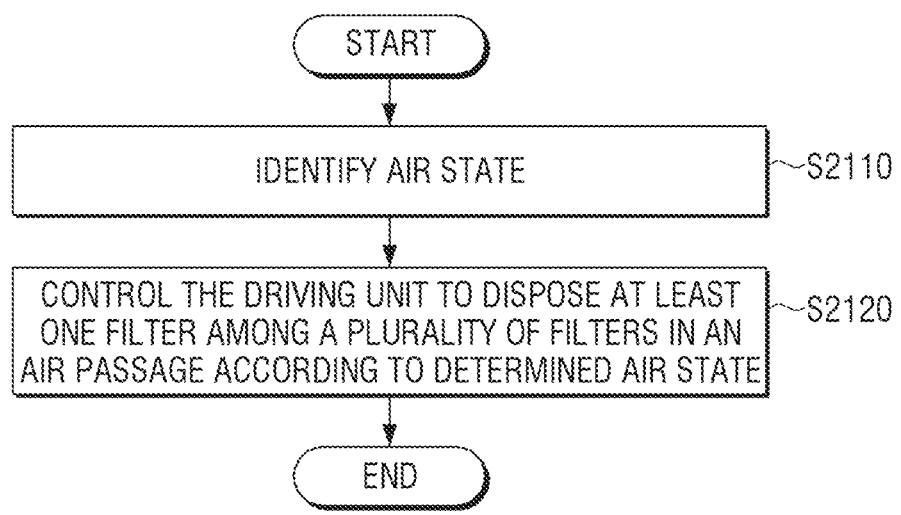
FIG. 21 is a flowchart to describe a method for controlling an air purifier according to an embodiment.

FIG. 21 is a flowchart to describe a method for controlling an air purifier including a driving unit for individually moving a plurality of filters according to an embodiment. The flowchart shown in FIG. 21 may be composed of operations processed by the air purifier 1000 described above. Therefore, even if omitted below, the above description of the air purifier 1000 may be applied to the flowchart illustrated in FIG. 21.

Referring to FIG. 21, the air purifier 1000 determines the air condition in operation S2110. The air purifier 1000 may identify the air condition based on the sensing value that is obtained through at least one of the gas sensor and the dust sensor inside or outside the air purifier 100.

The air purifier 1000 may control the driving unit to dispose at least one of the plurality of filters in the air passage inside the air purifier according to the identified air state in operation S2120.

In operation S2110, the air purifier 1000 may identify the type of gas based on the sensing value of the gas sensor, and in operation S2120, the air purifier 1000 may control the driving unit to dispose a filter corresponding to the identified gas type, among a plurality of filters, in the air passage.

The plurality of filters may include a harmful gas filter and a deodorizing filter, and in this case, in step S2120, the air purifier 1000 may control the driving unit so that the harmful gas filter is disposed in the air passage and the deodorizing filter is disposed outside the air passage, and if the identified gas type is a gas that generates odor and is not harmful, control the driving unit to dispose the deodorizing filter in the air passage and dispose the harmful gas filter outside the air passage.

The plurality of filters may include a plurality of dust filters, and in operation S2120, the air purifier 1000 may control the driving unit so as to dispose the dust filter in the number corresponding to the dust amount that is identified based on the sensing value of the dust sensor among the plurality of filters in the air passage.

The air purifier 1000 may be operating in a plurality of air purification modes, and receive a user input to select any one of a plurality of air purification modes. The air purifier 1000 may control the driving unit according to the air purification mode that is selected according to the user input.

The air purifier 1000 may store information on the history that each of the plurality of filters is disposed in the air passage, and provide a user with a notification of the filter replacement based on the information.

Meanwhile, in the above-described embodiments, the plurality of filters are described as being movable in the air purifier 1000. However, it may be designed so that only one or some of the plurality of filters are movable. In addition, the number of the filters of the air purifier 1000 does not need to be plural, and the air purifier 1000 including only one filter may be included in the disclosure.

According to various embodiments, since only a necessary filter can be disposed in the air passage, the noise of an air purifier generated while air is passing through unnecessary many filters can be reduced. In addition, according to various embodiments described above, a user-customized air purifier combined with only desired filters may be provided. According to the various embodiments described above, since individual contamination can be checked according to the use of a plurality of filters, an accurate filter replacement timing can be known. Therefore, convenience of the maintenance and repair of the air purifier can be improved.

Figure 22:
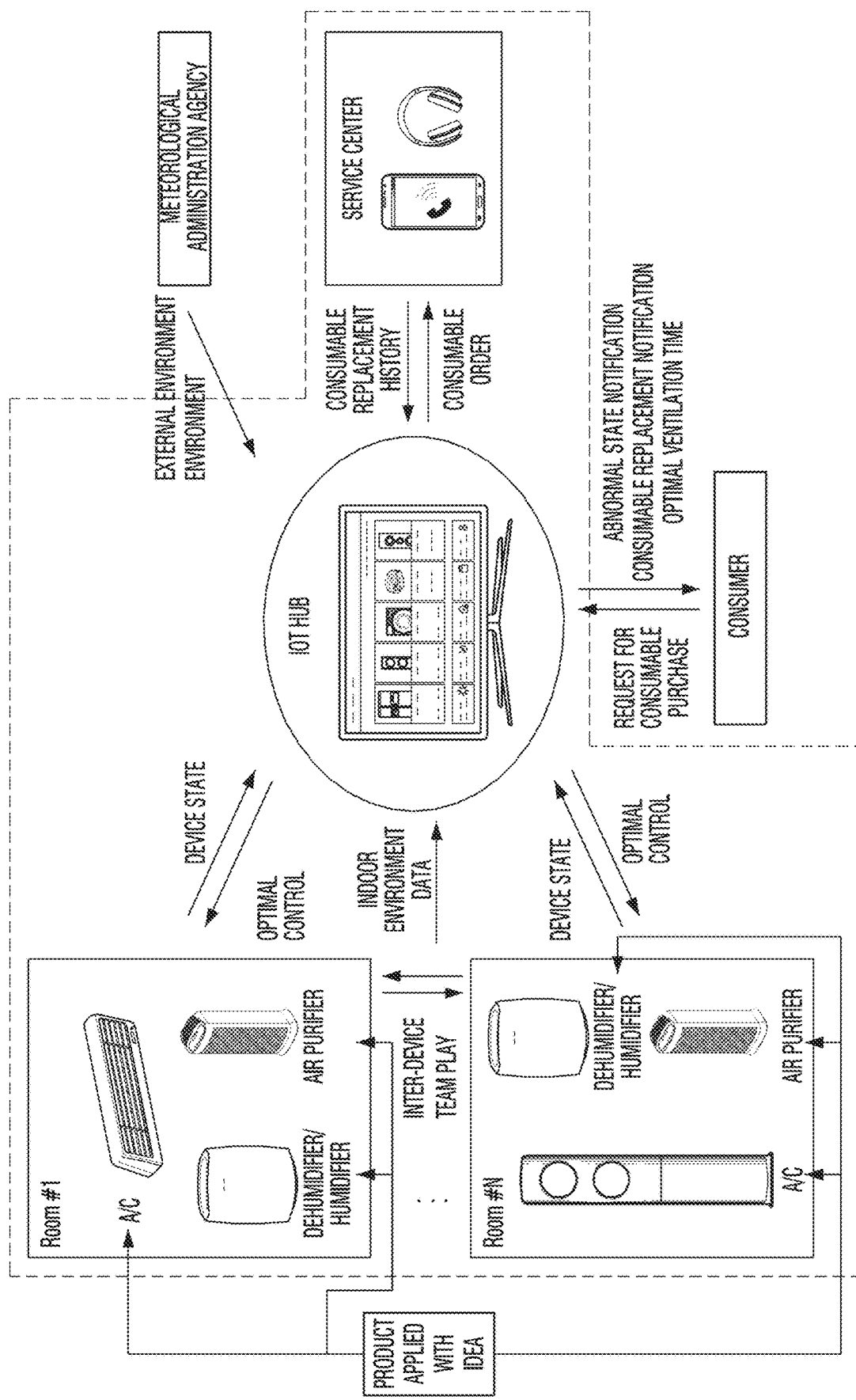
FIG. 22 is a view to describe an air purifier that is connected to the IoT hub and for providing a user with various services according to various embodiments.

As shown in FIG. 22, the air purifier 1000 according to the embodiments can be implemented with various devices such as an air cleaner, a dehumidifier, a humidifier, an air conditioner, or the like, and can be connected to the Internet of Things (IoT) hub to provide various services to a user. The IoT hub may be implemented as a specific device in a home appliance, and may be implemented, for example, as a user's mobile phone, a TV, or the like. The IoT hub may be connected to the service center, and may be connected to the meteorological administration agency to receive environmental information for harmful gases such as, for example, fine dust, ozone, carbon monoxide, nitrogen dioxide, sulfurous acid gas, or the like, to control each device in the home to an optimal state based on the received information. In addition to the devices shown in FIG. 22, for example, a humidifier, a smart window, an air purifier, a circulator, a hood, or the like, may also be controlled.

Figure 24:
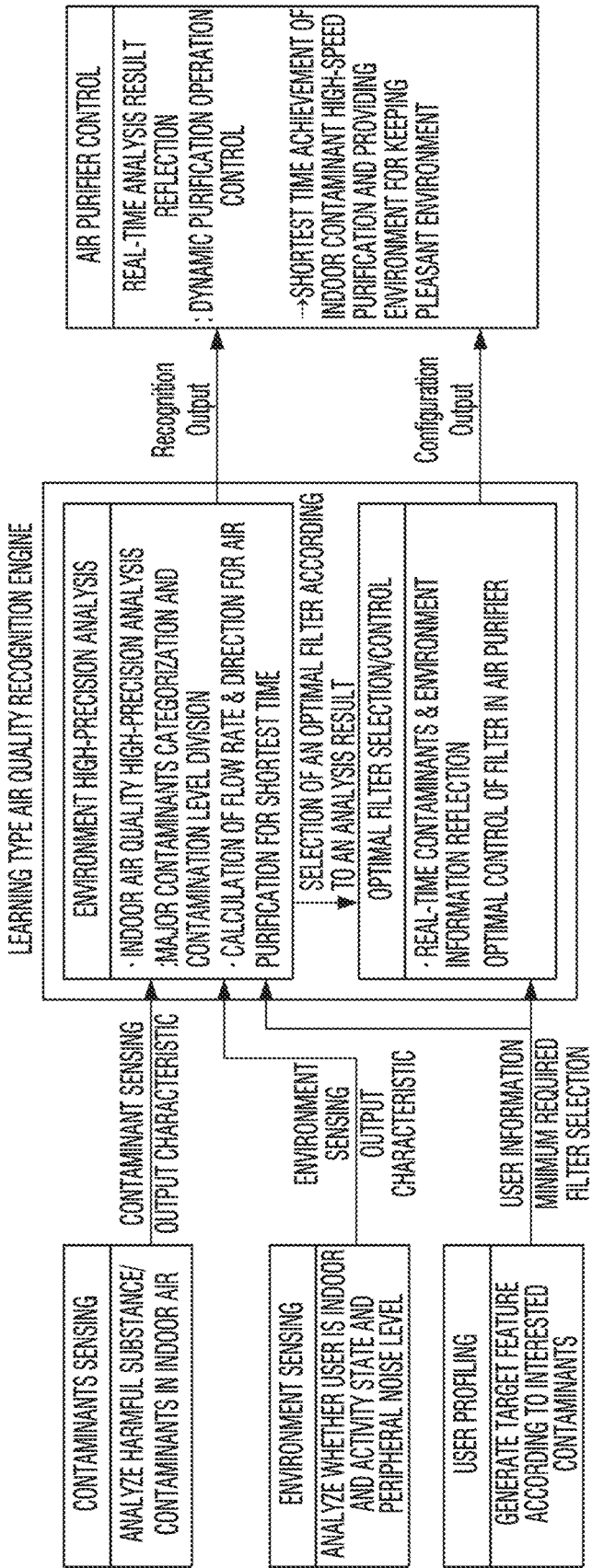
FIG. 24 is a view to describe a system flow of an air purifier according to an embodiment.

FIG. 24 is a view to describe a system flow of the air purifier 1000 according to an embodiment.

Referring to FIG. 24, the system flow of the air purifier 1000 may be composed of a data collection step, a data analysis step, and a control step. In the data collection step, contaminants sensing, environmental sensing operations, and user profiling through various sensors may be performed. The optimal operation mode can be identified by recognizing an air state in a data analysis step and applying the collected data to a learning type air quality recognition engine, which is an AI program for determining an optimal operation mode according to an air state. Thereafter, the air purifier 1000 can be controlled to operate in the identified operating mode in the data analysis step in the control step. In the control step, real-time operation control is performed on the basis of the analysis result of the recognition engine, and indoor contaminants may be removed within a shortest time.

The various embodiments described above may be implemented in software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. By software implementation, embodiments such as a procedure and a function described herein may be implemented with separate software modules. Each of the above-described software modules may perform one or more of the functions and operations described herein.

Meanwhile, various embodiments of the disclosure may be implemented in software, including instructions stored on machine-readable storage media readable by a machine (e.g., a computer). An apparatus may call instructions from the storage medium, and execute the called instruction, including an electronic apparatus (for example, the air purifier 1000) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

According to the embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An air purifier comprising:
   a plurality of filters arranged in a cylinder shape;
   a driver configured to individually move the plurality of filters along a circular path disposed in the air purifier; and
   a processor configured to control the driver so that at least two of the plurality of filters is disposed in an air passage in the air purifier according to an air state,
   wherein:
   the plurality of filters comprises a first filter and a second filter,
   the first filter and the second filter are movable along a different circular path, and
   based on disposing the first filter and the second filter in the air passage, inhaled air is filtered by the first filter and the air filtered by the first filter is filtered by the second filter.

2. The air purifier of claim 1, further comprising:
   a sensor configured to obtain a sensing value to identify the air state,
   wherein the sensor comprises at least one of a gas sensor, a dust sensor, and an environment sensor.

3. The air purifier of claim 2, wherein the processor is further configured to identify a type of a gas based on the sensing value of the sensor, and control the driver to dispose a filter, among the plurality of filters, that corresponds to the identified type of a gas on the air passage.

4. The air purifier of claim 3, wherein the plurality of filters comprise a harmful gas filter and a deodorizing filter, and
   wherein the processor is further configured to:
   based on the identified type of gas being a harmful gas, control the driver to dispose the harmful gas filter in the air passage and dispose the deodorizing filter outside the air passage, and
   based on the identified type of gas being a gas that generates odor and is not harmful, control the driver to dispose the deodorizing filter in the air passage, and dispose the harmful gas filter outside the air passage.

5. The air purifier of claim 2,
   wherein the plurality of filters comprise a plurality of dust filters, and
   wherein the processor is further configured to control the driver to dispose a dust filter, among the plurality of filters, in a number corresponding to a dust amount that is identified based on a sensing value of the dust sensor in the air passage.

6. The air purifier of claim 1, further comprising:
   an inputter configured to receive a user input for selecting any one of a plurality of air purification modes, and
   wherein the processor is further configured to control the driver according to an air purification mode that is selected through the inputter.

7. The air purifier of claim 1, further comprising:
   a memory configured to store information on history about each of the plurality of filters being disposed in the air passage, and
   wherein the processor is further configured to provide a user with a filter replacement notification based on the information.

8. The air purifier of claim 1, further comprising:
   a cyclone configured to suck air.

9. The air purifier of claim 1, further comprising:
   a communicator, and
   wherein the processor is further configured to:
   control the communicator to transmit a conversation message including state information of the air purifier to a message server, and based on the conversation message including control information being received from an electronic device that receives the conversation message through the message server, perform an air purification operation corresponding to the control information.

10. The air purifier of claim 1, further comprising:
    a microphone; and
    a speaker,
    wherein the processor is further configured to control the speaker to output a sound of a waveform to offset a waveform of a sound that is collected through the microphone.

* * * * *